United States Patent
Du et al.

(10) Patent No.: US 11,153,207 B2
(45) Date of Patent: *Oct. 19, 2021

(54) DATA LINK LAYER-BASED COMMUNICATION METHOD, DEVICE, AND SYSTEM

(71) Applicant: HUAWEI TECHNOLOGIES CO., LTD., Guangdong (CN)

(72) Inventors: Zongpeng Du, Beijing (CN); Sheng Jiang, Beijing (CN); Bing Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/745,877

(22) Filed: Jan. 17, 2020

(65) Prior Publication Data
US 2020/0153735 A1 May 14, 2020

Related U.S. Application Data

(63) Continuation of application No. 15/875,028, filed on Jan. 19, 2018, now Pat. No. 10,560,378, which is a
(Continued)

(51) Int. Cl.
*H04L 12/721* (2013.01)
*H04L 12/24* (2006.01)
*H04L 29/08* (2006.01)

(52) U.S. Cl.
CPC ............ *H04L 45/66* (2013.01); *H04L 41/00* (2013.01); *H04L 41/12* (2013.01); *H04L 69/324* (2013.01); *H04L 2212/00* (2013.01)

(58) Field of Classification Search
CPC ..... H04L 12/4633; H04L 41/00; H04L 41/12; H04L 45/66; H04L 45/741; H04L 63/08;
(Continued)

(56) References Cited

U.S. PATENT DOCUMENTS

2013/0318343 A1  11/2013  Bjarnason et al.
2013/0318570 A1  11/2013  Balaji et al.
(Continued)

FOREIGN PATENT DOCUMENTS

CN      1897518     1/2007
CN    101192928     6/2008
(Continued)

OTHER PUBLICATIONS

Behringer et al., "A Reference Model for Autonomic Networking;draft-behringer-anima-reference-model-03.txt", Internet Engineering Task Force, IETF; StandardWorkingDraft, Internet Society (ISOC), Rue des Falaises CH-1205, XP015106988, Geneva, Switzerland, Jun. 30, 2015, 30 pages.
(Continued)

*Primary Examiner* — Pao Sinkantarakorn
(74) *Attorney, Agent, or Firm* — Fish & Richardson P.C.

(57) ABSTRACT

A method includes: a first network device generates a data link layer-based autonomic control plane (L2 ACP) packet, wherein the first network device is an autonomic device in the autonomic network; encapsulates, based on a frame at a data link layer, the L2 ACP packet, wherein the frame at the data link layer comprises a source data link layer address and a destination data link layer address, and the source data link layer address is a data link layer address of the first network device; and sends, according to the destination data link layer address, the L2 ACP packet encapsulated based on the frame at the data link layer to a second network device, wherein the second network device is also an autonomic device in the autonomic network, and the second network device is a neighboring device of the first network device.

16 Claims, 8 Drawing Sheets

Related U.S. Application Data continuation of application No. PCT/CN2015/084772, filed on Jul. 22, 2015.

(58) Field of Classification Search
CPC .......... H04L 63/0823; H04L 2212/00; H04W 8/005; H04W 60/00
See application file for complete search history.

(56) References Cited

U.S. PATENT DOCUMENTS

| | | |
|---|---|---|
| 2014/0192808 A1 | 7/2014 | Thubert et al. |
| 2015/0055508 A1 | 2/2015 | Ashida et al. |
| 2018/0145905 A1 | 5/2018 | Du et al. |

FOREIGN PATENT DOCUMENTS

| | | |
|---|---|---|
| CN | 101399814 | 4/2009 |
| CN | 102148756 | 8/2011 |
| CN | 102811143 | 12/2012 |
| CN | 104335546 | 2/2015 |
| EP | 2731398 B1 | 10/2019 |
| WO | 2013177069 | 11/2013 |

OTHER PUBLICATIONS

Behringer et al., "An Autonomic Control Plane; draft-benrmger anima-autonomic-control-plane-03.txt", Internet Engineering Task Force, IETF; StandardWorkingDraft, Internet Society (ISOC) Rue des Falaises CH-1205, XP015106987, Geneva, Switzerland, Jun. 30, 2015, 18 pages.

Extended European Search Report in European Application No. 15898645.5 dated Mar. 22, 2018, 9 pages.

IEEE Std 802.1 AR-2009, IEEE Standards for Local and metropolitan area networks—Secure Device Identity,IEEE Computer Society Sponsored by the LAN/MAN Standards Committee, Dec. 22, 2009, 77 pages.

International Search Report and Written Opinion in International Application No. PCT/CN2015/084772, dated Mar. 31, 2016, 17 pages.

Office Action issued in Chinese Application No. 201580062638.0 dated May 5, 2019, 8 pages.

Okamoto et al., "Demonstration of the in-band message communication channel and Mac-in-Mac technology or GMPLS controlled new generation layer2 transport networks" Optical Fiber Communication—Incudes DOST Deadline Papers, Conference on, IEEE, XP03146757, Piscataway, NJ, USA, Mar. 22, 2009, 4 pages.

Extended European Search Report issued in European Application No. 19191634.5 dated Mar. 2, 2020, 8 pages.

200

| S210: A registrar device receives, from a network device, an adjacency discovery AD message encapsulated based on a frame at a data link layer, where the AD message includes a device identifier of the network device, the frame at the data link layer includes a source data link layer address and a destination data link layer address, the source data link layer address is a data link layer address of the network device, and the destination data link layer address matches a data link layer address of the registrar device |

| S220: When determining that the network device is allowed to join an autonomic network, the registrar device allocates a domain certificate to the network device according to the device identifier included in the AD message, and sends the domain certificate to the network device |

| S230: The registrar device establishes an autonomic control plane ACP with the network device according to the domain certificate |

A first network device generates a data link layer-based autonomic control plane L2 ACP packet, where the first network device is an autonomic device in an autonomic network — S310

The first network device encapsulates, based on a frame at a data link layer, the L2 ACP packet, where the frame at the data link layer includes a source data link layer address and a destination data link layer address, and the source data link layer address is a data link layer address of the first network device — S320

The first network device sends, according to the destination data link layer address, the L2 ACP packet encapsulated based on the frame at the data link layer to a second network device, where the second network device is also an autonomic device in the autonomic network, and the second network device is a neighboring device of the first network device — S330

A second network device receives an L2 ACP packet that is encapsulated based on a frame at a data link layer and that is sent by a first network device, where the L2 ACP packet includes a destination device identifier, the frame at the data link layer includes a source data link layer address and a destination data link layer address, the source data link layer address is a data link layer address of the first network device, the destination data link layer address matches a data link layer address of the second network device, and both the second network device and the first network device are autonomic devices in the autonomic network — S410

The second node processes the ACP packet by determining whether a device identifier of the second node matches the destination device identifier of the ACP packet — S420

FIG. 5

DATA LINK LAYER-BASED COMMUNICATION METHOD, DEVICE, AND SYSTEM

CROSS-REFERENCE TO RELATED APPLICATIONS

This application is a continuation of U.S. patent application Ser. No. 15/875,028, filed on Jan. 19, 2018, which is a continuation of International Application No. PCT/CN2015/084772, filed on Jul. 22, 2015. Both of the aforementioned applications are hereby incorporated by reference in their entireties.

TECHNICAL FIELD

Embodiments of the application relate to the communications field, and more specifically, to a data link layer-based communication method, device, and system.

BACKGROUND

An autonomic network (AN) is a network that can support self-management such as network self-configuration, network self-protection, network self-healing, and network self-optimization, and can improve a network automation degree. A key technology in the autonomic network is establishment of an autonomic control plane (ACP). The autonomic control plane ACP is a control plane in the autonomic network, and an upper-layer autonomic functional entity may use the ACP plane to transmit control signaling.

An implementation for establishing an ACP based on IPv6 (Internet Protocol Version 6) is proposed in a current technology. However, in the current technology, a network device needs to support IPv6 to establish the ACP. Consequently, compatibility of the autonomic network is poor.

SUMMARY

Embodiments of the application provide a data link layer-based communication method, device, and system. An autonomic network is established based on a data link layer, so as to resolve a problem in the prior art that an implementation of the autonomic network needs to depend on IPv6. This has better network compatibility.

According to a first aspect, a data link layer-based communication method is provided, where the method includes:

generating, by a network device, an adjacency discovery AD message, where the AD message includes a device identifier of the network device;

encapsulating, by the network device based on a frame at a data link layer, the AD message, where the frame at the data link layer includes a source data link layer address and a destination data link layer address, and the source data link layer address is a data link layer address of the network device;

sending, by the network device based on the destination data link layer address, the AD message encapsulated based on the frame at the data link layer to a registrar device, where the registrar device is a device that is in an autonomic network and that supports allocation of a domain certificate;

receiving, by the network device, a domain certificate sent by the registrar device, where the domain certificate is allocated by the registrar device to the network device according to the device identifier of the network device in the AD message; and establishing, by the network device, an autonomic control plane ACP with the registrar device according to the domain certificate.

With reference to the first aspect, in a first possible implementation of the first aspect, the frame at the data link layer is a frame that conforms to a definition in the Ethernet protocol, and a type value of a type field of the frame at the data link layer indicates that a data load field of the frame at the data link layer carries a data link layer-based autonomic control plane L2 ACP packet.

With reference to the first aspect or the first possible implementation of the first aspect, in a second possible implementation of the first aspect, a packet header of the L2 ACP packet includes a flag bit field, and a value of the flag bit field indicates that the L2 ACP packet is the AD message.

With reference to the first aspect and the foregoing implementations of the first aspect, in a third implementation of the first aspect, the packet header of the L2 ACP packet further includes a version field, a protocol field, and a data packet length field.

With reference to the first aspect and the foregoing implementations of the first aspect, in a fourth implementation of the first aspect, the data link layer address is a Media Access Control MAC address.

With reference to the first aspect and the foregoing implementations of the first aspect, in a fifth implementation of the first aspect, the device identifier is a unique device identifier UDI or a secure unique device identification SUDI.

According to a second aspect, a data link layer-based communication method is provided, where the method includes:

receiving, by a registrar device from a network device, an adjacency discovery AD message encapsulated based on a frame at a data link layer, where the AD message includes a device identifier of the network device, the frame at the data link layer includes a source data link layer address and a destination data link layer address, the source data link layer address is a data link layer address of the network device, and the destination data link layer address matches a data link layer address of the registrar device;

when determining that the network device is allowed to join the autonomic network, allocating, by the registrar device, a domain certificate to the network device according to the device identifier included in the AD message, and sending the domain certificate to the network device; and establishing, by the registrar device, an autonomic control plane ACP with the network device according to the domain certificate.

With reference to the second aspect, in a first implementation of the second aspect, the frame at the data link layer is a frame that conforms to a definition in the Ethernet protocol, and a type value of a type field of the frame at the data link layer indicates that a data load field of the frame at the data link layer carries a data link layer-based autonomic control plane L2 ACP packet.

With reference to the second aspect or the first implementation of the second aspect, in a second implementation of the second aspect, a packet header of the L2 ACP packet includes a flag bit field, and a value of the flag bit field indicates that the L2 ACP packet is the AD message.

With reference to the second aspect and the foregoing implementations of the second aspect, in a third implementation of the second aspect, the network device is a neighboring device of the registrar device, and the method further includes:

establishing, by the registrar device, a neighbor list of the registrar device according to the AD message, where the neighbor list includes the device identifier of the network device and the data link layer address of the network device.

With reference to the second aspect and the foregoing implementations of the second aspect, in a fourth implementation of the second aspect, the device identifier of the network device is a unique device identifier UDI of the network device; and the step that when determining that the network device is allowed to join the autonomic network, allocating, by the registrar device, a domain certificate to the network device according to the device identifier included in the AD message, and sending the domain certificate to the network device includes:

when determining that a whitelist has a match item for the UDI of the network device, determining, by the registrar device, that the network device is allowed to join the autonomic network, and sending, to the network device, the domain certificate allocated according to the UDI, where the whitelist includes a UDI of a device that is allowed to join the autonomic network.

With reference to the second aspect and the foregoing implementations of the second aspect, in a fifth implementation of the second aspect, the device identifier of the network device is a secure unique device identification S-UDI of the network device; and the step that when determining that the network device is allowed to join the autonomic network, allocating, by the registrar device, a domain certificate to the network device according to the device identifier included in the AD message, and sending the domain certificate to the network device includes:

when determining, by using a verification server, that a digital device certificate corresponding to the S-UDI is valid, determining, by the registrar device, that the network device is allowed to join the autonomic network, and sending, to the network device, the domain certificate allocated according to the digital device certificate.

With reference to the second aspect and the foregoing implementations of the second aspect, in a sixth implementation of the second aspect, the packet header of the L2 ACP packet further includes a version field, a protocol field, and a data packet length field.

With reference to the second aspect and the foregoing implementations of the second aspect, in a seventh implementation of the second aspect, the data link layer address is a Media Access Control MAC address.

According to a third aspect, a data link layer-based communication method is provided, where the communication method is applied to an autonomic network, and the method includes:

generating, by a first network device, a data link layer-based autonomic control plane L2 ACP packet, where the first network device is an autonomic device in the autonomic network;

encapsulating, by the first network device based on a frame at a data link layer, the L2 ACP packet, where the frame at the data link layer includes a source data link layer address and a destination data link layer address, and the source data link layer address is a data link layer address of the first network device; and sending, by the first network device according to the destination data link layer address, the L2 ACP packet encapsulated based on the frame at the data link layer to a second network device, where the second network device is also an autonomic device in the autonomic network, and the second network device is a neighboring device of the first network device.

With reference to the third aspect, in a first implementation of the third aspect, the frame at the data link layer is a frame that conforms to a definition in the Ethernet protocol, and a type value of a type field of the frame at the data link layer indicates that a data load field of the frame at the data link layer carries the L2 ACP packet.

With reference to the third aspect or the first implementation of the third aspect, in a second implementation of the third aspect, the generating, by a first network device, a data link layer-based autonomic control plane L2 ACP packet includes:

generating, by the first network device, the L2 ACP packet when the first network device needs to communicate with a target device in the autonomic network and determines that a neighbor list of the first network device includes a match item for a device identifier of the target device, where a packet header of the L2 ACP packet includes a flag bit field, a value of the flag bit field is used to indicate that the L2 ACP packet is a neighbor unicast packet, and the neighbor list of the first network device includes a device identifier and a data link layer address of a neighboring device of the first network device;

the encapsulating, by the first network device based on a frame at a data link layer, the L2 ACP packet includes:

encapsulating, by the first network device based on the frame at the data link layer, the L2 ACP packet, where the destination data link layer address of the frame at the data link layer is a data link layer address of the target device; and the sending, by the first network device according to the destination data link layer address, the L2 ACP packet encapsulated based on the frame at the data link layer to a second network device includes:

sending, by the first network device according to the data link layer address of the target device, the L2 ACP packet encapsulated based on the frame at the data link layer to the target device.

With reference to the third aspect or the first implementation of the third aspect, in a third implementation of the third aspect, the generating, by a first network device, a data link layer-based autonomic control plane L2 ACP packet includes:

generating, by the first network device, the L2 ACP packet when the first network device needs to communicate with a target device in the autonomic network and determines that the neighbor list does not include a match item for a device identifier of the target device, where a packet header of the L2 ACP packet includes a flag bit field, and a value of the flag bit field is used to indicate that the L2 ACP packet is a non-neighbor unicast packet;

the encapsulating, by the first network device based on a frame at a data link layer, the L2 ACP packet includes:

encapsulating, by the first network device based on the frame at the data link layer, the L2 ACP packet, where the destination data link layer address of the frame at the data link layer is a broadcast data link layer address; and the sending, by the first network device according to the destination data link layer address, the L2 ACP packet encapsulated based on the frame at the data link layer to a second network device includes:

sending, by the first network device according to the broadcast data link layer address, the L2 ACP packet encapsulated based on the frame at the data link layer to the second network device.

With reference to the third aspect or the first implementation of the third aspect, in a fourth implementation of the third aspect, the generating, by a first network device, an L2 ACP packet includes:

generating, by the first network device, the L2 ACP packet when the first network device needs to broadcast a control message in the ACP, where a packet header of the L2 ACP packet includes a flag bit field, and a value of the flag bit field is used to indicate that the L2 ACP packet is a broadcast packet;

the encapsulating, by the first network device based on a frame at a data link layer, the L2 ACP packet includes:

encapsulating, by the first network device based on the frame at the data link layer, the L2 ACP packet, where the destination data link layer address of the frame at the data link layer is a broadcast data link layer address; and the sending, by the first network device according to the destination data link layer address, the L2 ACP packet encapsulated based on the frame at the data link layer to a second network device includes:

sending, by the first network device according to the broadcast data link layer address, the L2 ACP packet encapsulated based on the frame at the data link layer to the second network device.

With reference to the third or the fourth implementation of the third aspect, in a fifth implementation of the third aspect, the packet header of the L2 ACP packet further includes a packet ID used to uniquely indicate the L2 ACP packet.

With reference to any one of the third to the fifth implementations of the third aspect, in a sixth implementation of the third aspect, the packet header of the L2 ACP packet further includes timing information, and the timing information is used to instruct a receiving device of the L2 ACP packet to clear the L2 ACP packet when a time for buffering the L2 ACP packet exceeds preset duration.

With reference to the third aspect and the foregoing implementations of the third aspect, in a seventh implementation of the third aspect, each device in the autonomic network has an IP address, and each autonomic device has a mapping relationship between a device identifier of each autonomic device and the IP address of each autonomic device; and the generating, by a first network device, a data link layer-based autonomic control plane L2 ACP packet includes:

generating, by the first network device, the L2 ACP packet when the first network device needs to communicate with a target device in the autonomic network by using an IP session, where the L2 ACP packet further includes a destination IP address, and the destination IP address is an IP address of the target device.

With reference to the third aspect and the foregoing implementations of the third aspect, in an eighth implementation of the third aspect, the packet header of the L2 ACP packet further includes a version field, a protocol field, and a data packet length field.

With reference to the third aspect and the foregoing implementations of the third aspect, in a ninth implementation of the third aspect, the data link layer address is a Media Access Control MAC address.

With reference to the third aspect and the foregoing implementations of the third aspect, in a tenth implementation of the third aspect, the device identifier is a unique device identifier UDI or a secure unique device identification SUDI.

According to a fourth aspect, a data link layer-based communication method is provided, where the communication method is applied to an autonomic network, and the method includes:

receiving, by a second network device, an L2 ACP packet that is encapsulated based on a frame at a data link layer and that is sent by a first network device, where the L2 ACP packet includes a destination device identifier, the frame at the data link layer includes a source data link layer address and a destination data link layer address, the source data link layer address is a data link layer address of the first network device, the destination data link layer address matches a data link layer address of the second network device, and both the second network device and the first network device are autonomic devices in the autonomic network; and processing, by the second network device, the L2 ACP packet by determining whether a device identifier of the second network device matches the destination device identifier in the L2 ACP packet.

With reference to the fourth aspect, in a first implementation of the fourth aspect, the frame at the data link layer is a frame that conforms to a definition in the Ethernet protocol, and a type value of a type field of the frame at the data link layer indicates that a data load field of the frame at the data link layer carries the L2 ACP packet.

With reference to the fourth aspect and the foregoing implementation of the fourth aspect, in a second implementation of the fourth aspect, a packet header of the L2 ACP packet includes a flag bit field, a value of the flag bit field is used to indicate that the L2 ACP packet is a neighbor unicast packet, and the destination data link layer address of the frame at the data link layer is a data link layer address of the target device; and the processing, by the second network device, the L2 ACP packet by determining whether a device identifier of the second network device matches the destination device identifier in the L2 ACP packet includes:

determining, by the second network device, that the destination device identifier is the device identifier of the second network device, and parsing the L2 ACP packet.

With reference to the fourth aspect or the first implementation of the fourth aspect, in a third implementation of the fourth aspect, a packet header of the L2 ACP packet includes a flag bit field, a value of the flag bit field is used to indicate that the L2 ACP packet is a non-neighbor unicast packet, and the destination data link layer address of the frame at the data link layer is a broadcast data link layer address; and the processing, by the second network device, the L2 ACP packet by determining whether a device identifier of the second network device matches the destination device identifier in the L2 ACP packet includes:

when the second network device determines that the device identifier of the second network device matches the destination device identifier, parsing the L2 ACP packet, and buffering the L2 ACP packet; or when the second network device determines that the device identifier of the second network device does not match the destination device identifier, buffering the L2 ACP packet, and forwarding, according to the destination data link layer address of the frame at the data link layer, the L2 ACP packet encapsulated based on the frame at the data link layer to a neighboring device of the second network device.

With reference to the fourth aspect or the first implementation of the fourth aspect, in a fourth implementation of the fourth aspect, a packet header of the L2 ACP packet includes a flag bit field, a value of the flag bit field is used to indicate that the L2 ACP packet is a broadcast packet, and the destination data link layer address of the frame at the data link layer is a broadcast data link layer address; and the processing, by the second network device, the L2 ACP packet by determining whether a device identifier of the second network device matches the destination device identifier in the L2 ACP packet includes:

determining, by the second network device, that the device identifier of the second network device matches the destination device identifier, parsing the L2 ACP packet, buffering the L2 ACP packet, and forwarding, according to the destination data link layer address of the frame at the data link layer, the L2 ACP packet encapsulated based on the frame at the data link layer to a neighboring device of the second network device.

With reference to the third or the fourth implementation of the fourth aspect, in a fifth implementation of the fourth aspect, the packet header of the L2 ACP packet further includes a packet ID used to uniquely identify the L2 ACP packet; and the processing, by the second network device, the L2 ACP packet by determining whether a device identifier of the second network device matches the destination device identifier in the L2 ACP packet includes:

when the second network device determines that the second network device does not buffer the packet ID, processing the L2 ACP packet by determining whether the device identifier of the second network device matches the destination device identifier.

With reference to any one of the third to the fifth implementations of the fourth aspect, in a sixth implementation of the fourth aspect, the packet header of the L2 ACP packet further includes timing information, and the timing information is used to instruct a receiving device of the L2 ACP packet to clear the L2 ACP packet when a time for buffering the L2 ACP packet exceeds preset duration; and the method further includes:

clearing the L2 ACP packet when the second network device determines that the time for buffering the L2 ACP packet exceeds the preset duration indicated by the timing information.

With reference to the fourth aspect and the foregoing implementations of the fourth aspect, in a seventh implementation of the fourth aspect, each autonomic device in the autonomic network has an IP address, each autonomic device has a mapping relationship between a device identifier of each autonomic device and the IP address of each autonomic device, and the L2 ACP packet further includes a destination IP address; and the processing, by the second network device, the L2 ACP packet by determining whether a device identifier of the second network device matches the destination device identifier in the L2 ACP packet includes:

when determining that the device identifier of the second network device does not match the destination device identifier in the L2 ACP packet, forwarding, by the second network device, the L2 ACP packet to a neighboring device of the second network device according to the destination data link layer address of the L2 ACP packet; or parsing the L2 ACP packet when the second network device determines that the device identifier of the second network device matches the destination device identifier in the L2 ACP packet and an IP address of the second network device matches the destination IP address of the L2 ACP packet.

With reference to the fourth aspect and the foregoing implementations of the fourth aspect, in an eighth implementation of the fourth aspect, the packet header of the L2 ACP packet further includes a version field, a protocol field, and a data packet length field.

With reference to the fourth aspect and the foregoing implementations of the fourth aspect, in a ninth implementation of the fourth aspect, the data link layer address is a Media Access Control MAC address.

With reference to the fourth aspect and the foregoing implementations of the fourth aspect, in a tenth implementation of the fourth aspect, the device identifier is a unique device identifier UDI or a secure unique device identification SUDI.

According to a fifth aspect, a network device is provided, where the network device is applied to an autonomic network, and the network device includes:

a generation module, configured to generate, by the network device, an adjacency discovery AD message, where the AD message includes a device identifier of the network device;

an encapsulation module, configured to encapsulate, based on a frame at a data link layer, the AD message generated by the generation module, where the frame at the data link layer includes a source data link layer address and a destination data link layer address, and the source data link layer address is a data link layer address of the network device;

a sending module, configured to send, to a registrar device based on the destination data link layer address, the AD message that is encapsulated based on the frame at the data link layer and that is determined by the encapsulation module, where the registrar device is a device that is in the autonomic network and that supports allocation of a domain certificate;

a receiving module, configured to receive a domain certificate sent by the registrar device, where the domain certificate is allocated by the registrar device to the network device according to the device identifier of the network device in the AD message; and an establishment module, configured to establish an autonomic control plane ACP with the registrar device according to the domain certificate received by the receiving module.

With reference to the fifth aspect, in a first possible implementation of the fifth aspect, the frame at the data link layer is a frame that conforms to a definition in the Ethernet protocol, and a type value of a type field of the frame at the data link layer indicates that a data load field of the frame at the data link layer carries a data link layer-based autonomic control plane L2 ACP packet.

With reference to the fifth aspect or the first possible implementation of the first aspect, in a second possible implementation of the fifth aspect, a packet header of the L2 ACP packet includes a flag bit field, and a value of the flag bit field indicates that the L2 ACP packet is the AD message.

With reference to the fifth aspect and the foregoing implementations of the fifth aspect, in a third implementation of the fifth aspect, the packet header of the L2 ACP packet further includes a version field, a protocol field, and a data packet length field.

With reference to the fifth aspect and the foregoing implementations of the fifth aspect, in a fourth implementation of the fifth aspect, the data link layer address is a Media Access Control MAC address.

With reference to the fifth aspect and the foregoing implementations of the fifth aspect, in a fifth implementation of the fifth aspect, the device identifier is a unique device identifier UDI or a secure unique device identification SUDI.

According to a sixth aspect, a registrar device is provided, where the registrar device is applied to an autonomic network, the registrar device is a device that is in the autonomic network and that supports allocation of a domain certificate, and the registrar device includes:

a receiving module, configured to receive, from a network device, an adjacency discovery AD message encapsulated based on a frame at a data link layer, where the AD message includes a device identifier of the network device, the frame at the data link layer includes a source data link layer address and a destination data link layer address, the source data link layer address is a data link layer address of the network device, and the destination data link layer address matches a data link layer address of the registrar device;

a sending module, configured to: when determining that the network device is allowed to join the autonomic network, allocate a domain certificate to the network device according to the device identifier included in the AD message received by the receiving module, and send the domain certificate to the network device; and an ACP establishment module, configured to establish an autonomic control plane ACP with the network device according to the domain certificate sent by the sending module.

With reference to the sixth aspect, in a first implementation of the sixth aspect, the frame at the data link layer is a frame that conforms to a definition in the Ethernet protocol, and a type value of a type field of the frame at the data link layer indicates that a data load field of the frame at the data link layer carries a data link layer-based autonomic control plane L2 ACP packet.

With reference to the sixth aspect or the first implementation of the sixth aspect, in a second implementation of the sixth aspect, a packet header of the L2 ACP packet includes a flag bit field, and a value of the flag bit field indicates that the L2 ACP packet is the AD message.

With reference to the sixth aspect and the foregoing implementations of the sixth aspect, in a third implementation of the sixth aspect, the network device is a neighboring device of the registrar device, and the registrar device further includes:

a neighbor list establishment module, configured to establish a neighbor list of the registrar device according to the AD message, where the neighbor list includes the device identifier of the network device and the data link layer address of the network device.

With reference to the sixth aspect and the foregoing implementations of the sixth aspect, in a fourth implementation of the sixth aspect, the device identifier of the network device is a unique device identifier UDI of the network device; and the sending module is specifically configured to: when determining that a whitelist has a match item for the UDI of the network device, determine that the network device is allowed to join the autonomic network, and send, to the network device, the domain certificate allocated according to the UDI, where the whitelist includes a UDI of a device that is allowed to join the autonomic network.

With reference to the sixth aspect and the foregoing implementations of the sixth aspect, in a fifth implementation of the sixth aspect, the device identifier of the network device is a secure unique device identification S-UDI of the network device; and the sending module is specifically configured to: when determining, by using a verification server, that a digital device certificate corresponding to the S-UDI is valid, determine that the network device is allowed to join the autonomic network, and send, to the network device, the domain certificate allocated according to the digital device certificate.

With reference to the sixth aspect and the foregoing implementations of the sixth aspect, in a sixth implementation of the sixth aspect, the packet header of the L2 ACP packet further includes a version field, a protocol field, and a data packet length field.

With reference to the sixth aspect and the foregoing implementations of the sixth aspect, in a seventh implementation of the sixth aspect, the data link layer address is a Media Access Control MAC address.

According to a seventh aspect, a network device is provided, where the network device serves as a first network device, the first network device is applied to an autonomic network, and the first network device includes:

a generation module, configured to generate a data link layer-based autonomic control plane L2 ACP packet, where the first network device is an autonomic device in the autonomic network;

an encapsulation module, configured to encapsulate, based on a frame at a data link layer, the L2 ACP packet generated by the generation module, where the frame at the data link layer includes a source data link layer address and a destination data link layer address, and the source data link layer address is a data link layer address of the first network device; and a sending module, configured to send, to a second network device according to the destination data link layer address, the L2 ACP packet that is encapsulated by the encapsulation module based on the frame at the data link layer, where the second network device is also an autonomic device in the autonomic network, and the second network device is a neighboring device of the first network device.

With reference to the seventh aspect, in a first implementation of the seventh aspect, the frame at the data link layer is a frame that conforms to a definition in the Ethernet protocol, and a type value of a type field of the frame at the data link layer indicates that a data load field of the frame at the data link layer carries the L2 ACP packet.

With reference to the seventh aspect or the first implementation of the seventh aspect, in a second implementation of the seventh aspect, the generation module is specifically configured to: generate the L2 ACP packet when the first network device needs to communicate with a target device in the autonomic network and the generation module determines that a neighbor list of the first network device includes a match item for a device identifier of the target device, where a packet header of the L2 ACP packet includes a flag bit field, a value of the flag bit field is used to indicate that the L2 ACP packet is a neighbor unicast packet, and the neighbor list of the first network device includes a device identifier and a data link layer address of a neighboring device of the first network device;

the encapsulation module is specifically configured to encapsulate, based on the frame at the data link layer, the L2 ACP packet, where the destination data link layer address of the frame at the data link layer is a data link layer address of the target device; and the sending module is specifically configured to send, according to the data link layer address of the target device, the L2 ACP packet encapsulated based on the frame at the data link layer to the target device.

With reference to the seventh aspect or the first implementation of the seventh aspect, in a third implementation of the seventh aspect, the generation module is specifically configured to generate the L2 ACP packet when the first network device needs to communicate with a target device in the autonomic network and the generation module determines that the neighbor list does not include a match item for a device identifier of the target device, where a packet header of the L2 ACP packet includes a flag bit field, and a value of the flag bit field is used to indicate that the L2 ACP packet is a non-neighbor unicast packet;

the encapsulation module is specifically configured to encapsulate, based on the frame at the data link layer, the L2 ACP packet, where the destination data link layer address of the frame at the data link layer is a broadcast data link layer address; and the sending module is specifically configured to send, according to the broadcast data link layer address, the L2 ACP packet encapsulated based on the frame at the data link layer to the second network device.

With reference to the seventh aspect or the first implementation of the seventh aspect, in a fourth implementation of the seventh aspect, the generation module is specifically configured to generate the L2 ACP packet when the first network device needs to broadcast a control message in the ACP, where a packet header of the L2 ACP packet includes a flag bit field, and a value of the flag bit field is used to indicate that the L2 ACP packet is a broadcast packet;

the encapsulation module is specifically configured to encapsulate, based on the frame at the data link layer, the L2 ACP packet, where the destination data link layer address of the frame at the data link layer is a broadcast data link layer address; and the sending module is specifically configured to send, according to the broadcast data link layer address, the L2 ACP packet encapsulated based on the frame at the data link layer to the second network device.

With reference to the third or the fourth implementation of the seventh aspect, in a fifth implementation of the seventh aspect, the packet header of the L2 ACP packet further includes a packet ID used to uniquely indicate the L2 ACP packet.

With reference to any one of the third to the fifth implementations of the seventh aspect, in a sixth implementation of the seventh aspect, the packet header of the L2 ACP packet further includes timing information, and the timing information is used to instruct a receiving device of the L2 ACP packet to clear the L2 ACP packet when a time for buffering the L2 ACP packet exceeds preset duration.

With reference to the seventh aspect and the foregoing implementations of the seventh aspect, in a seventh implementation of the seventh aspect, each device in the autonomic network has an IP address, and each autonomic device has a mapping relationship between a device identifier of each autonomic device and the IP address of each autonomic device; and the generation module is specifically configured to generate the L2 ACP packet when the first network device needs to communicate with a target device in the autonomic network by using an IP session, where the L2 ACP packet further includes a destination IP address, and the destination IP address is an IP address of the target device.

With reference to the seventh aspect and the foregoing implementations of the seventh aspect, in an eighth implementation of the seventh aspect, the packet header of the L2 ACP packet further includes a version field, a protocol field, and a data packet length field.

With reference to the seventh aspect and the foregoing implementations of the seventh aspect, in a ninth implementation of the seventh aspect, the data link layer address is a Media Access Control MAC address.

With reference to the seventh aspect and the foregoing implementations of the seventh aspect, in a tenth implementation of the seventh aspect, the device identifier is a unique device identifier UDI or a secure unique device identification SUDI.

According to an eighth aspect, a network device is provided, where the network device serves as a second network device, the second network device is applied to an autonomic network, and the second network device includes:

a receiving module, configured to receive an L2 ACP packet that is encapsulated based on a frame at a data link layer and that is sent by a first network device, where the L2 ACP packet includes a destination device identifier, the frame at the data link layer includes a source data link layer address and a destination data link layer address, the source data link layer address is a data link layer address of the first network device, the destination data link layer address matches a data link layer address of the second network device, and both the second network device and the first network device are autonomic devices in the autonomic network; and a processing module, configured to process, by determining whether a device identifier of the second network device matches the destination device identifier in the L2 ACP packet, the L2 ACP packet received by the receiving module.

With reference to the eighth aspect, in a first implementation of the eighth aspect, the frame at the data link layer is a frame that conforms to a definition in the Ethernet protocol, and a type value of a type field of the frame at the data link layer indicates that a data load field of the frame at the data link layer carries the L2 ACP packet.

With reference to the eighth aspect and the foregoing implementation of the eighth aspect, in a second implementation of the eighth aspect, a packet header of the L2 ACP packet includes a flag bit field, a value of the flag bit field is used to indicate that the L2 ACP packet is a neighbor unicast packet, and the destination data link layer address of the frame at the data link layer is a data link layer address of the target device; and the processing module is specifically configured to: determine that the destination device identifier is the device identifier of the second network device, and parse the L2 ACP packet.

With reference to the eighth aspect or the first implementation of the eighth aspect, in a third implementation of the eighth aspect, a packet header of the L2 ACP packet includes a flag bit field, a value of the flag bit field is used to indicate that the L2 ACP packet is a non-neighbor unicast packet, and the destination data link layer address of the frame at the data link layer is a broadcast data link layer address; and the processing module is specifically configured to: when determining that the device identifier of the second network device matches the destination device identifier, parse the L2 ACP packet, and buffer the L2 ACP packet; or the processing module is specifically configured to: when determining that the device identifier of the second network device does not match the destination device identifier, buffer the L2 ACP packet, and forward, according to the destination data link layer address of the frame at the data link layer, the L2 ACP packet encapsulated based on the frame at the data link layer to a neighboring device of the second network device.

With reference to the eighth aspect or the first implementation of the eighth aspect, in a fourth implementation of the eighth aspect, a packet header of the L2 ACP packet includes a flag bit field, a value of the flag bit field is used to indicate that the L2 ACP packet is a broadcast packet, and the destination data link layer address of the frame at the data link layer is a broadcast data link layer address; and the processing module is specifically configured to: determine that the device identifier of the second network device matches the destination device identifier, parse the L2 ACP packet, buffer the L2 ACP packet, and forward, according to the destination data link layer address of the frame at the data link layer, the L2 ACP packet encapsulated based on the frame at the data link layer to a neighboring device of the second network device.

With reference to the third or the fourth implementation of the eighth aspect, in a fifth implementation of the eighth aspect, the packet header of the L2 ACP packet further includes a packet ID used to uniquely identify the L2 ACP packet; and the processing module is specifically configured to: when determining that the processing module does not buffer the packet ID, process the L2 ACP packet by determining whether the device identifier of the second network device matches the destination device identifier.

With reference to any one of the third to the fifth implementations of the eighth aspect, in a sixth implementation of the eighth aspect, the packet header of the L2 ACP packet further includes timing information, and the timing information is used to instruct a receiving device of the L2 ACP packet to clear the L2 ACP packet when a time for buffering the L2 ACP packet exceeds preset duration; and the second network device further includes:

a buffer clearing module, configured to clear the L2 ACP packet when determining that the time for buffering the L2 ACP packet exceeds the preset duration indicated by the timing information.

With reference to the eighth aspect and the foregoing implementations of the eighth aspect, in a seventh implementation of the eighth aspect, each autonomic device in the autonomic network has an IP address, each autonomic device has a mapping relationship between a device identifier of each autonomic device and the IP address of each autonomic device, and the L2 ACP packet further includes a destination IP address; and the processing module is specifically configured to: when determining that the device identifier of the second network device does not match the destination device identifier in the L2 ACP packet, forward the L2 ACP packet to a neighboring device of the second network device according to the destination data link layer address of the L2 ACP packet; or parse the L2 ACP packet when determining that the device identifier of the second network device matches the destination device identifier in the L2 ACP packet and that an IP address of the second network device matches the destination IP address of the L2 ACP packet.

With reference to the eighth aspect and the foregoing implementations of the eighth aspect, in an eighth implementation of the eighth aspect, the packet header of the L2 ACP packet further includes a version field, a protocol field, and a data packet length field.

With reference to the eighth aspect and the foregoing implementations of the eighth aspect, in a ninth implementation of the eighth aspect, the data link layer address is a Media Access Control MAC address.

With reference to the eighth aspect and the foregoing implementations of the eighth aspect, in a tenth implementation of the eighth aspect, the device identifier is a unique device identifier UDI or a secure unique device identification SUDI.

According to a ninth aspect, a data link layer-based system is provided, where the system includes the network device according to the fifth aspect and the registrar device according to the sixth aspect.

According to a tenth aspect, a data link layer-based system is provided, where the system includes the network device according to the seventh aspect and the network device according to the eighth aspect.

Based on the foregoing technical solutions, in the embodiments of the application, an AD message is encapsulated based on a frame at a data link layer, the AD message encapsulated based on the frame at the data link layer is sent to a registrar device based on a destination data link layer address of the frame at the data link layer, a domain certificate sent by the registrar device is received, and an autonomic control plane ACP is established with the registrar device according to the domain certificate. Therefore, in the embodiments of the application, establishment of an ACP may not depend on the IP protocol, that is, communication based on an autonomic network may be imperceptive of the IP protocol. This has better network compatibility in comparison with the prior art, and can effectively reduce obstacles to autonomic network deployment.

BRIEF DESCRIPTION OF DRAWINGS

To describe the technical solutions in the embodiments of the application more clearly, the following briefly describes the accompanying drawings required for describing the embodiments or the prior art. Apparently, the accompanying drawings in the following description show merely some embodiments of the application, and a person of ordinary skill in the art may still derive other drawings from these accompanying drawings without creative efforts.

FIG. 3 shows another schematic flowchart of a data link layer-based communication method according to an embodiment of the application;

FIG. 4 shows still another schematic flowchart of a data link layer-based communication method according to an embodiment of the application;

FIG. 5 shows yet another schematic flowchart of a data link layer-based communication method according to an embodiment of the application;

DESCRIPTION OF EMBODIMENTS

Figure 1:
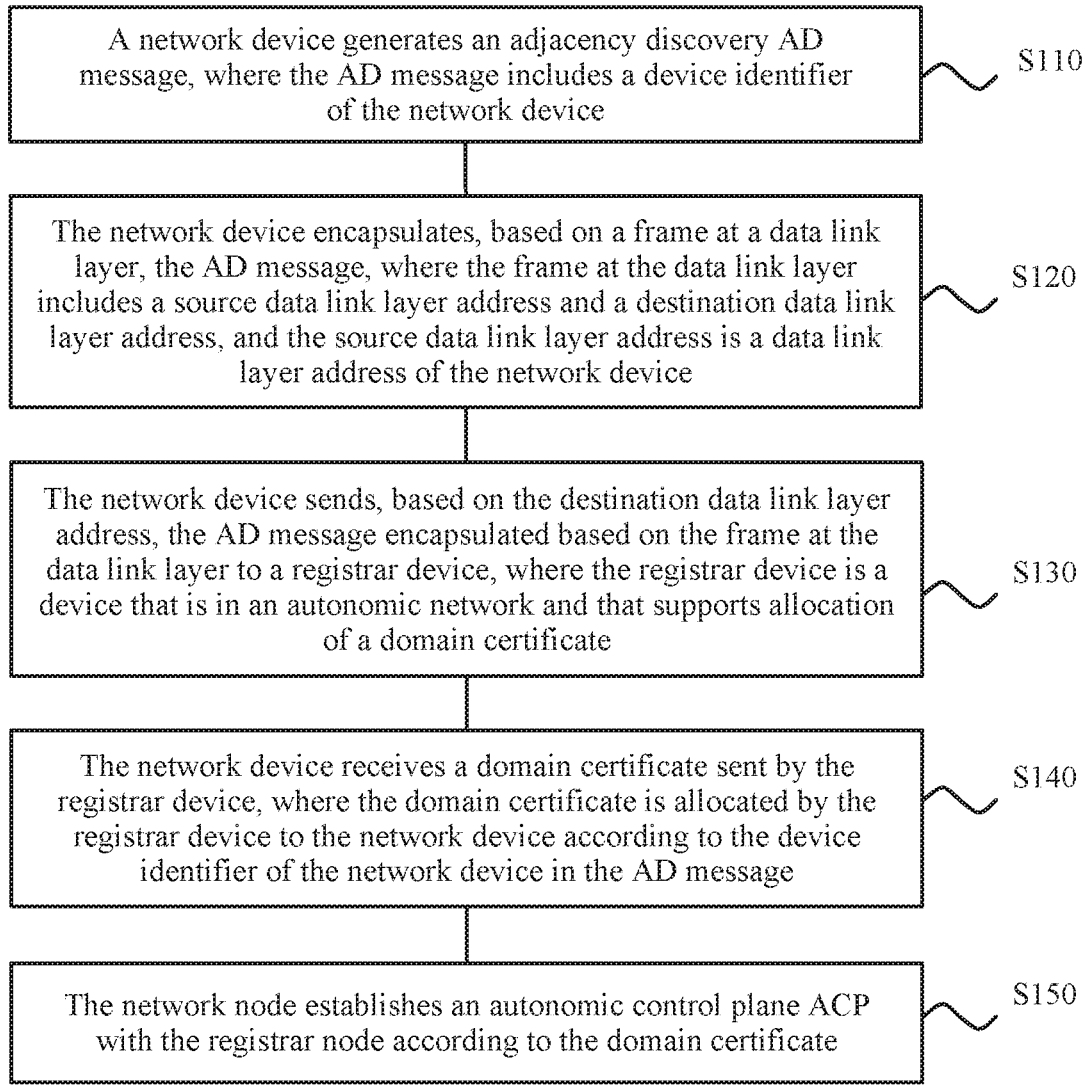
FIG. 1 shows a schematic flowchart of a data link layer-based communication method according to an embodiment of the application.

The following clearly and describes the technical solutions in the embodiments of the application with reference to the accompanying drawings in the embodiments of the application. Apparently, the described embodiments are some but not all of the embodiments of the application. All other embodiments obtained by a person of ordinary skill in the art based on the embodiments of the application without creative efforts shall fall within the protection scope of the application.

It should be understood that, the technical solutions in the application may be applied to various communications systems, for example, a fixed network communications system such as an access network system, an aggregation network system, a backbone network system, or a dedicated network system. The technical solutions in the application may be applied to a mobile communications system such as a Universal Mobile Telecommunications System (UMTS), a Global System for Mobile Communications (Global System of Mobile communication, "GSM" for short), a general packet radio service (General Packet Radio Service, "GPRS" for short), or a Long Term Evolution (LTE) system. This is not limited in the embodiments of the application.

It should be further understood that, a device involved in the embodiments of the application may be a network device such as a router, a switch, or user equipment. The user equipment may also be referred to as a terminal, a mobile station (MS), a mobile terminal, or the like. The user equipment may access the Internet or a corporate network by using a wired network. The user equipment may also communicate with one or more core networks by using a radio access network (RAN). For example, the user equipment may be a mobile phone (or referred to as a "cell" phone) or a computer having a mobile terminal, or may be a portable, pocket-sized, handheld, computer built-in, or vehicle-mounted mobile apparatus that exchanges voice and/or data with the radio access network.

It should be understood that, to support an autonomic feature, an existing ACP technical solution needs to first support IPv6. Because construction of an ACP depends on an implementation of IPv6, network compatibility is poor, and network deployment is difficult. This causes management troubles.

It should be understood that, in the prior art, an ACP is established based on a network layer (or referred to as an L3 layer). However, in the application, an ACP is established based on a data link layer (or referred to as an L2 layer). In comparison with the prior art, this implements that establishment of an ACP may be imperceptive of the IP protocol, that is, establishment of an ACP does not depend on whether a network device supports the IPv4 protocol or the IPv6 protocol. In addition, a network device that supports IPv4 and a network device that supports IPv6 may jointly form an autonomic network, so that network compatibility is improved, and deployment difficulties are reduced.

It should be understood that, all devices involved in the embodiments of the application are autonomic devices, that is, the devices support an autonomic feature. The devices have respective unique device identifiers (UDI) or device certificates (DevID Certificate). That the devices support an autonomic feature means that the devices have a function of automatically establishing an ACP or automatically joining an ACP.

It should be further understood that, a registrar device involved in the embodiments of the application is a device that can allocate a domain certificate to a device (including the registrar device) in an autonomic domain. For example, the registrar device has a connection and may communicate with a digital certificate authentication management authority. That is, the registrar device can allocate a domain certificate to all devices in the autonomic domain by using the digital certificate authentication management authority. Specifically, for example, the registrar device determines, according to a device identifier of a device, whether the device is allowed to join the autonomic domain, and allocates a domain certificate to the device according to the device identifier of the device if determining that the device is allowed to join the autonomic domain, and vice versa. Specifically, the device identifier of the device may be a unique device identifier UDI or may be a device certificate. This is not limited in the embodiments of the application. It should be understood that, the registrar device first allocates a domain certificate to the registrar device.

FIG. 1 shows a schematic flowchart of a data link layer-based communication method 100 according to an embodiment of the application. For example, the method may be executed by a network device in an autonomic network. The method 100 includes the following steps.

S110. The network device generates an adjacency discovery AD message, where the AD message includes a device identifier of the network device.

S120. The network device encapsulates, based on a frame at a data link layer, the AD message, where the frame at the data link layer includes a source data link layer address and a destination data link layer address, and the source data link layer address is a data link layer address of the network device.

It should be understood that, the destination data link layer address of the frame at the data link layer may be a broadcast data link layer address or a data link layer address of a neighboring device of the network device.

S130. The network device sends, based on the destination data link layer address, the AD message encapsulated based on the frame at the data link layer to a registrar device, where the registrar device is a device that is in the autonomic network and that supports allocation of a domain certificate.

S140. The network device receives a domain certificate sent by the registrar device, where the domain certificate is allocated by the registrar device to the network device according to the device identifier of the network device in the AD message.

S150. The network device establishes an autonomic control plane ACP with the registrar device according to the domain certificate.

In this embodiment of the application, an AD message is encapsulated based on a frame at a data link layer, the AD message encapsulated based on the frame at the data link layer is sent to a registrar device based on a destination data link layer address of the frame at the data link layer, a domain certificate sent by the registrar device is received, and an autonomic control plane ACP is established with the registrar device according to the domain certificate. Therefore, in this embodiment of the application, establishment of an ACP may not depend on the IP protocol, that is, communication based on an autonomic network may be imperceptive of the IP protocol. This has better network compatibility in comparison with the prior art, and can effectively reduce obstacles to autonomic network deployment.

In this embodiment of the application, optionally, the data link layer address is a Media Access Control (MAC) address.

In all the following examples, an example in which the data link layer address is a MAC address is used for description.

It should be understood that, in this embodiment of the application, an adjacency discovery (AD) message is encapsulated based on a frame at a data link layer. It should be understood that, in this embodiment of the application, after the AD message is generated, the AD message is encapsulated directly based on the frame at the data link layer instead of being encapsulated based on an IP packet. That is, in this embodiment of the application, the AD message is directly encapsulated in the frame at the data link layer, and is not encapsulated based on the IP packet any longer. Therefore, the AD message in this embodiment of the application may be imperceptive of the IP protocol or an IP address, so that an implementation of an autonomic control plane ACP may not depend on the IP protocol such as IPv6 or IPv4. Therefore, in this embodiment of the application, an ACP is implemented based on a data link layer. This has better network compatibility in comparison with the prior art, and also reduces difficulties in autonomic network deployment.

It should be further understood that, the destination data link layer address of the frame at the data link layer is a broadcast data link layer address or a data link layer address of a neighboring device of the network device. The neighboring device may be the registrar device or a proxy device. The registrar device may be a neighboring device or a non-neighboring device of the network device. This is not limited in this embodiment of the application.

Optionally, in this embodiment of the application, the neighboring device of the network device includes the registrar device.

The destination MAC address of the frame at the data link layer is a MAC address of the registrar device or a MAC broadcast address.

S130 in which the network device sends, based on the destination data link layer address, the AD message encapsulated based on the frame at the data link layer to a registrar device, where the registrar device is a device that is in the autonomic network and that supports allocation of a domain certificate includes:

the network device directly sends, according to the destination MAC address, the AD message encapsulated based on the frame at the data link layer to the registrar device.

That is, the AD message is sent from the network device to the registrar device without being forwarded by an intermediate device. This case may also be referred to as transmitting the AD message from the network device to the registrar device in a neighbor unicast manner.

Optionally, in this embodiment of the application, the registrar device is not a neighboring device of the network device.

The destination MAC address of the frame at the data link layer is a MAC broadcast address.

S130 in which the network device sends, based on the destination data link layer address, the AD message encapsulated based on the frame at the data link layer to a registrar device, where the registrar device is a device that is in the autonomic network and that supports allocation of a domain certificate includes:

the network device sends, based on the destination data link layer address by using a proxy device that has a domain certificate allocated by the registrar device, the AD message encapsulated based on the frame at the data link layer to the registrar device that is in the autonomic network and that supports allocation of a domain certificate.

Figure 2:
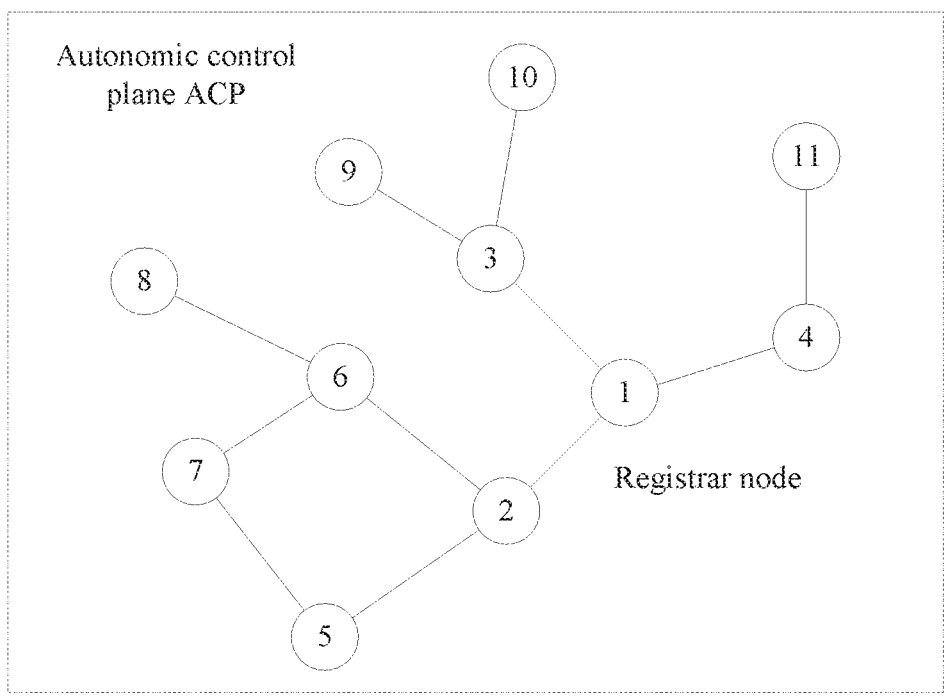
FIG. 2 shows a schematic diagram of a data link layer-based communication method according to an embodiment of the application.

Specifically, FIG. 2 is used as an example for description. For example, the network device is a device 5 in FIG. 2, and the registrar device is a device 1 in FIG. 2. In this case, the device 5 sends an AD message to an intermediate device 2. When determining that the network device does not have a domain certificate, the intermediate device 2 applies to the registrar device for a domain certificate of the device 5. The intermediate device 2 further receives the domain certificate allocated by the registrar device to the device 5, and sends the domain certificate of the device 5 to the device 5. The intermediate device 2 is a network device that already has a domain certificate allocated by the registrar device. A network device that already has a domain certificate may be referred to as a proxy device.

In S150, the network device establishes the autonomic control plane ACP with the registrar device. Specifically, the network device and the registrar device perform mutual authentication based on the domain certificate of the network device and a domain certificate of the registrar device (the registrar device first allocates a domain certificate to the registrar device), and establish a security connection at the data link layer, for example, establish a MACsec channel. This process may be referred to as establishing the autonomic control plane ACP between the network device and the registrar device.

Optionally, in this embodiment of the application, the frame at the data link layer is a frame that conforms to a definition in the Ethernet protocol, and a type value of a type field of the frame at the data link layer indicates that a data load field of the frame at the data link layer carries a data link layer-based autonomic control plane L2 ACP packet.

Specifically, the L2 ACP packet in this embodiment of the application is used to indicate a packet, based on the data link layer, that is transmitted in the ACP. It should be understood that, that the AD message is encapsulated based on the frame at the data link layer means that the data load field of the frame at the data link layer carries the AD message. The type field of the frame at the data link layer indicates that a message carried in the data load field is the L2 ACP packet. It may be considered that the L2 ACP packet includes the AD message.

Specifically, for example, the type value of the type field of the frame at the data link layer is 0x88e7.

Optionally, in this embodiment of the application, a packet header of the L2 ACP packet includes a flag bit field, and a value of the flag bit field indicates that the L2 ACP packet is the AD message.

Specifically, the packet header of the AD message includes the flag bit field used to indicate that the L2 ACP packet is the AD message.

Optionally, in this embodiment of the application, the packet header of the L2 ACP packet further includes a version field, a protocol field, and a data packet length field.

Specifically, Table 1 shows a format of the AD message according to this embodiment of the application:

TABLE 1

| Packet header |
| --- |
| Packet content |

It may be learned from Table 1 that, the AD message provided in this embodiment of the application includes the packet header and the packet content. The packet content includes information such as the device identifier (such as a UDI) or the domain certificate of the network device. It should be understood that, after the domain certificate is allocated to the network device, the AD message of the network device may carry the domain certificate of the network device.

The packet header of the AD message may be specifically shown in Table 2:

TABLE 2

| Version | Flag bit | Protocol | Data packet length |
| --- | --- | --- | --- |

As shown in Table 2, the packet header of the AD message includes the version field, the flag bit field, the protocol field, and the data packet length field. A value of the version field indicates a version of a protocol corresponding to the AD message, for example, the version field has four bits in total. The flag bit field has four bits, for example, a value of the flag bit field is 0000 and is used to indicate that the AD message is the AD message. A value of the protocol field is used to indicate a protocol of content carried in the data load field of the frame at the data link layer, and the protocol field has eight bits in total. For example, a value of a protocol field corresponding to the IP protocol may be used. The data packet length field has 16 bits in total, and a value of the data packet length field is used to indicate a length of the entire data packet.

A format of the AD message encapsulated based on the frame at the data link layer is shown in Table 3:

TABLE 3

| Destination MAC address | Source MAC address | Type |
| --- | --- | --- |
| Packet header | | |
| Packet content | | |

It may be learned from Table 3 that, the format of the AD message encapsulated based on the frame at the data link layer includes a frame header of the frame at the data link layer, the packet header, and the packet content. The packet header and the packet content are shown in the foregoing Table 1 and Table 2. The frame header of the frame at the data link layer includes the destination MAC address, the source MAC address, and the type field. The destination MAC address may be a MAC broadcast address or a MAC address of a neighboring device of the network device, and the source MAC address is a MAC address of the network device. A type value of the type field indicates that the data load field of the frame at the data link layer carries the data link layer-based autonomic control plane L2 ACP packet. Specifically, the type field may apply for a value of 0x88e7.

It should be understood that, Table 1, Table 2, and Table 3 are merely examples instead of limitations.

It should be understood that, in this embodiment of the application, the AD message may also be referred to as the L2 ACP packet. All devices at the data link layer can identify the AD message, that is, the AD message can be effectively transmitted and received at the data link layer. For example, after receiving, from the network device, the AD message encapsulated based on the data link layer, the registrar device parses the frame at the data link layer to obtain the AD message, so as to obtain information such as the device identifier (such as a UDI) or the MAC address of the network device that is carried in the AD message.

In S140, the network device receives the domain certificate sent by the registrar device. The domain certificate is allocated by the registrar device to the network device according to the device identifier of the network device in the AD message. Specifically, the registrar device determines, according to the device identifier, whether the network device is allowed to join the autonomic network, and if determining that the network device is allowed to join the autonomic network, allocates the domain certificate according to the device identifier, and sends the domain certificate to the network device.

Optionally, in this embodiment of the application, the device identifier is a unique device identifier (UDI) or a secure unique device identification (SUDI).

Optionally, in this embodiment of the application, the device identifier of the network device is a unique device identifier UDI of the network device.

That the network device receives a domain certificate sent by the registrar device according to the device identifier includes:

the network device receives the domain certificate sent by the registrar device according to the UDI of the network device, where the domain certificate is configured by the registrar device for the network device when the registrar device determines that a whitelist has a match item for the UDI of the network device, and the whitelist includes a UDI of a device that is allowed to join the autonomic domain.

Specifically, for example, when the device identifier is a UDI, the registrar device determines, according to the whitelist, whether the network device is allowed to join the autonomic domain. The whitelist records a UDI of a device that is allowed to join the autonomic domain. When the registrar device finds, in the whitelist, the match item for the UDI of the network device, the registrar device allocates the domain certificate to the network device based on the UDI of the network device by using, for example, a digital certificate authentication management authority. If the registrar network device cannot find, in the whitelist, the match item for the UDI of the network device, the registrar device determines that the network device is not allowed to join the autonomic domain.

It should be understood that, the whitelist may be configured for the registrar device manually, or may be imported to the registrar device in another manner. This is not limited in this embodiment of the application.

Optionally, in this embodiment of the application, the device identifier of the network device is a secure unique device identification SUDI of the network device.

That the network device receives a domain certificate sent by the registrar device according to the device identifier includes:

the network device receives the domain certificate sent by the registrar device according to the SUDI, where the domain certificate is allocated by the registrar device to the network device according to the device identifier when the registrar device determines that a digital device certificate corresponding to the SUDI is valid and determines, according to a verification result of a verification server, that the network device is allowed to join the autonomic domain.

Specifically, for example, when the device identifier is a secure unique device identification SUDI, the network device sends, to the registrar device, the digital device certificate corresponding to the SUDI.

The registrar device allocates the domain certificate to the network device according to the SUDI when verifying that the digital device certificate is valid and determining, according to the verification result of the verification server, that the network device is allowed to join the autonomic domain.

For ease of description and understanding, in the following examples, an example in which the device identifier is a UDI is used for description.

It should be understood that, after an autonomic feature of a device in the autonomic network is enabled, the device periodically (for example, every 10 s) sends an AD message, to determine a neighboring device of the device. The AD message includes a UDI of the autonomic device. Optionally, if the autonomic device has a domain certificate, the AD message may carry the domain certificate of the autonomic device. Each device constructs a neighbor list of the device according to a received AD message.

It should be understood that, when a device A receives an AD message, and determines that a destination MAC address (such as a MAC broadcast address) carried in the AD message matches a MAC address of the device, the device may know that a source sending device of the AD message is a neighboring device of the device, and update a neighbor list of the device with a UDI and a source MAC address carried in the AD message.

Optionally, in this embodiment of the application, the method 100 further includes the following steps.

S160. The network device receives, from a neighboring device of the network device, an AD message encapsulated based on the frame at the data link layer, where the AD message includes a device identifier and a MAC address of the neighbor node.

It should be understood that, a format of the AD message that is encapsulated based on the frame at the data link layer and is from the neighboring device of the network device is also shown in the foregoing Table 3.

S170. The network device establishes a neighbor list of the network device according to the AD message, where the neighbor list includes the device identifier of the neighboring device and the data link layer address of the neighboring device.

Specifically, in addition to the device identifier of the neighboring device and the data link layer address (the MAC address) of the neighboring device, the neighbor list may further include security authentication information of the neighboring device. Specifically, the neighbor list is shown in Table 4:

TABLE 4

UDI
MAC address
Security authentication information (Trust information)
Security authentication verification information (Validity of the trust)

As shown in Table 4, a neighbor list of a device includes a UDI, a MAC address, security information, and authentication information of a neighboring device. The security authentication information (Trust information) may include security authentication type information, an authentication time, and other information, for example, the certificate chain, and if available. The security authentication verification information (Validity of the trust) is used to indicate whether the neighboring device is authenticated by the registrar device, that is, whether a domain certificate is allocated to the neighboring device.

Specifically, FIG. 2 shows a schematic diagram of an autonomic network, and 11 autonomic devices are given as an example. It is assumed that the device 1 is the registrar device, devices 2, 3, and 4 are neighboring devices of the device 1, devices 5 and 6 are neighboring devices of the device 2, devices 7 and 8 are neighboring devices of the device 6, the device 7 is also a neighboring device of the device 5, devices 9 and 10 are neighboring devices of the device 3, and a device 11 is a neighboring device of the device 4. For example, the device 2 sends an AD message that includes a UDI of the device 2 to the registrar device (which is corresponding to a case in which the network device is a neighboring device of the registrar device in this embodiment of the application). If the registrar device finds, in a whitelist, a match item for the UDI of the device 2, the registrar device allocates a domain certificate to the device 2. Then, the registrar device and the device 2 perform mutual authentication based on respective domain certificates, and establish a security connection, that is, an ACP is established between the device 1 and the device 2.

In the foregoing example, the registrar device allocates the domain certificate to the device 2, and establishes the security connection to the device 2, that is, the device 2 is authenticated. In this case, the device 2 may serve as a proxy (Proxy) point or an authentication point to forward an AD message of a neighboring device of the device 2 to the registrar device, so that the registrar device performs authentication on the neighboring device of the device 2.

Specifically, for example, if the neighboring device 5 of the device 2 has not obtained a domain certificate, after the device 2 receives an AD message sent by the device 5, the device 2 detects, after parsing the AD message, that the device 5 does not have the domain certificate. Based on this, the device 2 may determine that the device 5 has not been authenticated, and triggers a procedure for forwarding the AD message of the device 5. Because the device 2 has established the security connection to the registrar device, the device 2 has known a UDI of the registrar device. Therefore, the device 2 may forward the AD message of the device 5 to the registrar device based on the UDI of the registrar device. A subsequent process in which the registrar device performs authentication on the device 5 and allocates a domain certificate is similar to the procedure for allocating the domain certificate to the device 2, and details are not described herein again. It should be understood that, after allocating the domain certificate to the device 5, the registrar device forwards the domain certificate to the device 5 by using the device 2.

It should be noted that, in this embodiment, before the domain certificate is allocated to the device 5, the AD message of the device 5 does not have the domain certificate. In this case, in a neighbor list established by the device 2 according to the AD message of the device 5, an item of validity of the trust corresponding to the device 5 has not been authenticated. An AD message subsequently sent by the device 5 after the device 5 obtains the domain certificate carries the domain certificate.

It should be understood that, when determining that an item of validity of the trust of a neighboring device of a proxy (Proxy) point or an authentication point that is authenticated by the registrar device, the proxy point or the authentication point forwards an AD message of the neighboring device to the registrar device, so that the registrar device performs authentication on the neighboring device.

It should be further understood that, in the example shown in FIG. 2, similar to the process of performing authentication on the device 2 and the device 5, AD messages of other autonomic devices shown in FIG. 2 are all transmitted to the registrar device for authentication. It is assumed that the registrar device allocates a domain certificate to all the devices shown in FIG. 2, that is, security connections are established among all the devices shown in FIG. 2, that is, an autonomic control plane ACP is established among the 11 devices.

It should be understood that, for ease of understanding and description, the foregoing uses FIG. 2 as an example to describe a process of establishing an ACP between devices. FIG. 2 is merely an example instead of a limitation.

In this embodiment of the application, an AD message is encapsulated based on a frame at a data link layer, the AD message encapsulated based on the frame at the data link layer is sent to a registrar device based on a destination data link layer address of the frame at the data link layer, a domain certificate sent by the registrar device is received, and an autonomic control plane ACP is established with the registrar device according to the domain certificate. Therefore, in this embodiment of the application, establishment of an ACP may not depend on the IP protocol, that is, communication based on an autonomic network may be imperceptive of the IP protocol. This has better network compatibility in comparison with the prior art, and can effectively reduce obstacles to autonomic network deployment.

In the foregoing, the data link layer-based communication method provided in the embodiments of the application is described from a perspective of a transmit end device of an AD message with reference to FIG. 1 and FIG. 2. In the following, the data link layer-based communication method provided in the embodiments of the application is described from a perspective of a receive end device of an AD message.

FIG. 3 shows a schematic flowchart of a data link layer-based communication method 200 according to an embodiment of the application. For example, the method may be executed by a registrar device that is in an autonomic network and that supports allocation of a domain certificate. The method 200 includes the following steps.

S210. The registrar device receives, from a network device, an adjacency discovery AD message encapsulated based on a frame at a data link layer, where the AD message includes a device identifier of the network device, the frame at the data link layer includes a source data link layer address and a destination data link layer address, the source data link layer address is a data link layer address of the network device, and the destination data link layer address matches a data link layer address of the registrar device.

It should be understood that, that the destination data link layer address matches a data link layer address of the registrar device means that the destination data link layer address is the data link layer address of the registrar device, or that the destination data link layer address is a broadcast data link layer address. It should be understood that, it may be considered that the broadcast data link layer address matches any fixed data link layer address.

S220. When determining that the network device is allowed to join the autonomic network, the registrar device allocates a domain certificate to the network device according to the device identifier included in the AD message, and sends the domain certificate to the network device.

S230. The registrar device establishes an autonomic control plane ACP with the network device according to the domain certificate.

Specifically, the network device and the registrar device perform mutual authentication based on the domain certificate of the network device and a domain certificate of the registrar device (the registrar device first allocates a domain certificate to the registrar device), and establish a security connection at the data link layer, for example, establish a MACsec channel. This process may be referred to as establishing the autonomic control plane ACP between the network device and the registrar device.

In this embodiment of the application, an adjacency discovery AD message of a device is encapsulated based on a frame at a data link layer. The AD message is sent, based on a data link layer address, to a registrar device that is in an autonomic network and that allocates a domain certificate. The registrar device allocates a domain certificate to the device according to the AD message. The device establishes an autonomic control plane ACP with the registrar device based on the domain certificate. Therefore, in this embodiment of the application, establishment of an ACP may not depend on the IP protocol, that is, communication based on an autonomic network may be imperceptive of the IP protocol. This has better network compatibility in comparison with the prior art, and can effectively reduce obstacles to autonomic network deployment.

It should be understood that, in this embodiment of the application, an adjacency discovery (AD) message is encapsulated based on a frame at a data link layer. It should be understood that, in this embodiment of the application, after the AD message is generated, the AD message is encapsulated directly based on the frame at the data link layer instead of being encapsulated based on an IP packet. That is, in this embodiment of the application, the AD message is directly encapsulated in the frame at the data link layer, and is not encapsulated based on the IP packet any longer. Therefore, the AD message in this embodiment of the application may be imperceptive of the IP protocol or an IP address, so that an implementation of an autonomic control plane ACP may not depend on the IP protocol such as IPv6 or IPv4. Therefore, in this embodiment of the application, an ACP is implemented based on a data link layer. This has better network compatibility in comparison with the prior art, and also reduces difficulties in autonomic network deployment.

In this embodiment of the application, optionally, the data link layer address is a Media Access Control (MAC) address.

In all the following examples, an example in which the data link layer address is a MAC address is used for description.

It should be further understood that, the destination data link layer address of the frame at the data link layer is a broadcast data link layer address or a data link layer address of a neighboring device of the network device. The registrar device may be a neighboring device or a non-neighboring device of the network device. This is not limited in this embodiment of the application.

Optionally, in this embodiment of the application, the neighboring device of the network device includes the registrar device.

The destination MAC address of the frame at the data link layer is a MAC address of the registrar device or a MAC broadcast address.

Specifically, the network device directly sends, according to the destination MAC address, the AD message encapsulated based on the frame at the data link layer to the registrar device. That is, the AD message is sent from the network device to the registrar device by using one hop without being forwarded by an intermediate device. This case may also be referred to as transmitting the AD message from the network device to the registrar device in a neighbor unicast manner.

Optionally, in this embodiment of the application, the registrar device is not a neighboring device of the network device.

The destination MAC address of the frame at the data link layer is a MAC broadcast address.

S210 in which the registrar device receives, from a network device, an adjacency discovery AD message encapsulated based on a frame at a data link layer includes:

the registrar device receives the adjacency discovery AD message of the network device by using a proxy device that has a domain certificate allocated by the registrar device.

Specifically, as a schematic diagram of an autonomic network shown in FIG. 2, it is assumed that a device 1 is the registrar device, devices 2, 3, and 4 are neighboring devices of the device 1, devices 5 and 6 are neighboring devices of the device 2, devices 7 and 8 are neighboring devices of the device 6, the device 7 is also a neighboring device of the device 5, devices 9 and 10 are neighboring devices of the device 3, and a device 11 is a neighboring device of the device 4. For example, the device 2 sends an AD message that includes a UDI of the device 2 to the registrar device (which is corresponding to a case in which the network device is a neighboring device of the registrar device in this embodiment of the application). If the registrar device finds, in a whitelist, a match item for the UDI of the device 2, the registrar device allocates a domain certificate to the device 2. Then, the registrar device and the device 2 perform mutual authentication based on respective domain certificates, and establish a security connection, that is, an ACP is established between the device 1 and the device 2.

In the foregoing example, the registrar device allocates the domain certificate to the device 2, and establishes the security connection to the device 2, that is, the device 2 is authenticated. In this case, the device 2 may serve as a proxy (Proxy) point or an authentication point to forward an AD message of a neighboring device of the device 2 to the registrar device, so that the registrar device performs authentication on the neighboring device of the device 2.

Specifically, for example, if the neighboring device 5 of the device 2 has not obtained a domain certificate, after the device 2 receives an AD message sent by the device 5, the device 2 detects, after parsing the AD message, that the device 5 does not have the domain certificate. Based on this, the device 2 may determine that the device 5 has not been authenticated, and triggers a procedure for forwarding the AD message of the device 5. Because the device 2 has established the security connection to the registrar device, the device 2 has known a UDI of the registrar device. Therefore, the device 2 may forward the AD message of the device 5 to the registrar device based on the UDI of the registrar device. A subsequent process in which the registrar device performs authentication on the device 5 and allocates a domain certificate is similar to the procedure for allocating the domain certificate to the device 2, and details are not described herein again. It should be understood that, after allocating the domain certificate to the device 5, the registrar device forwards the domain certificate to the device 5 by using the device 2.

It should be noted that, in this embodiment, before the domain certificate is allocated to the device 5, the AD message of the device 5 does not have the domain certificate. In this case, in a neighbor list established by the device 2 according to the AD message of the device 5, an item of validity of the trust corresponding to the device 5 has not been authenticated. An AD message subsequently sent by the device 5 after the device 5 obtains the domain certificate carries the domain certificate.

Optionally, in this embodiment of the application, the frame at the data link layer is a frame that conforms to a definition in the Ethernet protocol, and a type value of a type field of the frame at the data link layer indicates that a data load field of the frame at the data link layer carries a data link layer-based autonomic control plane L2 ACP packet.

Specifically, the L2 ACP packet in this embodiment of the application is used to indicate a packet, based on the data link layer, that is transmitted in the ACP. It should be understood that, that the AD message is encapsulated based on the frame at the data link layer means that the data load field of the frame at the data link layer carries the AD message. The type field of the frame at the data link layer indicates that a message carried in the data load field is the L2 ACP packet. It may be considered that the L2 ACP packet includes the AD message.

Specifically, for example, the type value of the type field of the frame at the data link layer is 0x88e7.

Optionally, in this embodiment of the application, a packet header of the L2 ACP packet includes a flag bit field, and a value of the flag bit field indicates that the L2 ACP packet is the AD message.

Specifically, the packet header of the AD message includes the flag bit field used to indicate that the L2 ACP packet is the AD message.

Optionally, in this embodiment of the application, the packet header of the L2 ACP packet further includes a version field, a protocol field, and a data packet length field.

A format of the AD message encapsulated based on the frame at the data link layer is shown in Table 3. For specific descriptions, refer to the foregoing descriptions. For brevity, details are not described herein again.

Optionally, in this embodiment of the application, the network device is a neighboring device of the registrar device, and the method 200 further includes the following step:

S240. The registrar device establishes a neighbor list of the registrar device according to the AD message, where the neighbor list includes the device identifier of the network device and the data link layer address of the network device.

Specifically, the neighbor list established by the registrar device according to the AD message is shown in Table 4. For details, refer to the foregoing descriptions.

In S220, when determining that the neighboring device is allowed to join the autonomic domain, the registrar device allocates a domain certificate to the neighboring device according to the device identifier, and sends the domain certificate to the network device.

Optionally, in this embodiment of the application, the device identifier is a unique device identifier (UDI) or a secure unique device identification (SUDI).

Optionally, in this embodiment of the application, the device identifier of the network device is a unique device identifier UDI of the network device.

S220 in which when determining that the network device is allowed to join the autonomic network, the registrar device allocates a domain certificate to the network device according to the device identifier included in the AD message, and sends the domain certificate to the network device includes the following step:

S221. When determining that a whitelist has a match item for the UDI of the network device, the registrar device determines that the network device is allowed to join the autonomic network, and sends, to the network device, the domain certificate allocated according to the UDI, where the whitelist includes a UDI of a device that is allowed to join the autonomic network.

Specifically, for example, when the device identifier is a UDI, the registrar device determines, according to the whitelist, whether the network device is allowed to join the autonomic domain. The whitelist records a UDI of a device that is allowed to join the autonomic domain. When the registrar device finds, in the whitelist, the match item for the UDI of the network device, the registrar device allocates the domain certificate to the network device based on the UDI of the network device by using, for example, a digital certificate authentication management authority. If the registrar network device cannot find, in the whitelist, the match item for the UDI of the network device, the registrar device determines that the network device is not allowed to join the autonomic domain.

Optionally, in this embodiment of the application, the device identifier of the network device is a secure unique device identification S-UDI of the network device.

S220 in which when determining that the network device is allowed to join the autonomic network, the registrar device allocates a domain certificate to the network device according to the device identifier included in the AD message, and sends the domain certificate to the network device includes the following step:

S222. When determining, by using a verification server, that a digital device certificate corresponding to the S-UDI is valid, the registrar device determines that the network device is allowed to join the autonomic network, and sends, to the network device, the domain certificate allocated according to the digital device certificate.

Specifically, for example, when the device identifier is a secure unique device identification SUDI, the network device sends, to the registrar device, a digital device certificate corresponding to the SUDI.

The registrar device allocates the domain certificate to the network device according to the SUDI when verifying that the digital device certificate is valid and determining, according to a verification result of the verification server, that the network device is allowed to join the autonomic domain.

In this embodiment of the application, an adjacency discovery AD message of a device is encapsulated based on a frame at a data link layer. The AD message is sent, based on a data link layer address, to a registrar device that is in an autonomic network and that allocates a domain certificate. The registrar device allocates a domain certificate to the device according to the AD message. The device establishes an autonomic control plane ACP with the registrar device based on the domain certificate. Therefore, in this embodiment of the application, establishment of an ACP may not depend on the IP protocol, that is, communication based on an autonomic network may be imperceptive of the IP protocol. This has better network compatibility in comparison with the prior art, and can effectively reduce obstacles to autonomic network deployment.

It should be understood that, after an ACP is established between autonomic devices, an upper-layer autonomic functional entity may use the ACP plane to transmit a control message. Specifically, the control message may be control signaling that implements a control function and/or a management function.

FIG. 4 shows a schematic flowchart of a data link layer-based communication method 300 according to an embodiment of the application. The communication method is applied to an autonomic network. An autonomic control plane ACP of the autonomic network is established based on a data link layer. The method 300 includes the following steps.

S310. A first network device generates a data link layer-based autonomic control plane L2 ACP packet, where the first network device is an autonomic device in the autonomic network.

Specifically, the first network device receives a communication task from an upper-layer autonomic functional entity. For example, the communication task instructs the first network device to send a control message to a target device in the ACP, or instructs the first network device to broadcast a control message in the ACP. The first network device generates the L2 ACP packet according to the communication task. Specifically, the control message may be control signaling that implements a control function and/or a management function.

S320. The first network device encapsulates, based on a frame at a data link layer, the L2 ACP packet, where the frame at the data link layer includes a source data link layer address and a destination data link layer address, and the source data link layer address is a data link layer address of the first network device.

It should be understood that, the destination data link layer address of the frame at the data link layer is a data link layer address of a neighboring device of the first network device or a broadcast data link layer address.

S330. The first network device sends, according to the destination data link layer address, the L2 ACP packet encapsulated based on the frame at the data link layer to a second network device, where the second network device is also an autonomic device in the autonomic network, and the second network device is a neighboring device of the first network device.

In this embodiment of the application, the L2 ACP packet is encapsulated based on a frame at a data link layer, and the L2 ACP packet encapsulated based on the frame at the data link layer is sent to a second network device according to the destination data link layer address. In this embodiment of the application, a packet may be transmitted in an ACP without depending on the IP protocol. This has better network compatibility in comparison with the prior art.

In addition, unlike the prior art, in this embodiment of the application, a network device may not need to maintain a routing table.

It should be understood that, the autonomic control plane ACP in this embodiment of the application is established based on the data link layer. For a specific establishment process, refer to the foregoing descriptions in the method 100 and the method 200. Details are not described herein again.

It should be further understood that, in this embodiment of the application, the L2 ACP packet is encapsulated based on a frame at an L2, and is not encapsulated based on an IP packet at a network layer any longer. That is, in this embodiment of the application, the L2 ACP packet may be transmitted by using a forwarding table resource (such as a MAC forwarding table) at the data link layer without depending on the IP protocol at the network layer or an IP routing table.

It should be further understood that, in this embodiment of the application, a MAC forwarding table resource at the L2 may be a neighbor list that each device has. For example, a neighbor list of a device A includes a device identifier and a MAC address of a neighboring device of the device A. Therefore, when the device A needs to send an L2 ACP packet, the device A determines a destination MAC address of the L2 ACP packet based on the MAC address of the neighboring device (one or more) included in the neighbor list, so as to send the L2 ACP packet to a corresponding neighboring device. Alternatively, the device A sets a destination MAC address of the L2 ACP packet to a MAC broadcast address, and then sends the MAC packet by using an interface between the device A and the neighboring device. It should be understood that, it is considered that the MAC broadcast address matches any MAC address. Therefore, all neighboring devices of the device A can receive the L2 ACP packet.

In conclusion, unlike the prior art, in this embodiment of the application, signaling is transmitted in the ACP without depending on the IP protocol or an IP routing table, and the IP protocol or an IP address may not be perceived. This has better network compatibility in comparison with the prior art.

Optionally, in this embodiment of the application, the data link layer address is a Media Access Control (MAC) address.

In all the following examples, an example in which the data link layer address is a MAC address is used for description.

Optionally, in this embodiment of the application, the device identifier is a unique device identifier UDI or a secure unique device identification SUDI.

Optionally, in this embodiment of the application, the frame at the data link layer is a frame that conforms to a definition in the Ethernet protocol, and a type value of a type field of the frame at the data link layer indicates that a data load field of the frame at the data link layer carries the L2 ACP packet.

Specifically, for example, the type value of the type field of the frame at the data link layer is 0x88e7.

Optionally, in this embodiment of the application, a packet header of the L2 ACP packet further includes a version field, a protocol field, and a data packet length field.

Specifically, Table 5 provides an example of a format of the L2 ACP packet according to this embodiment of the application.

TABLE 5

Packet header
Packet content

It may be learned from Table 5 that, the L2 ACP packet includes the packet header and the packet content. For example, the packet content of the L2 ACP packet includes a control message indicated in the communication task delivered from the upper-layer autonomic functional entity. Specifically, the control message may be control signaling that implements a control function and/or a management function. The packet header of the L2 ACP packet may be specifically shown in Table 6:

TABLE 6

| Version | Flag bit | Protocol | Data packet length |
|---|---|---|---|
| Source UDI | | | |
| Destination UDI | | | |

Specifically, the packet header of the L2 ACP packet includes the version field, the flag bit field, the protocol field, the data packet length field, the source UDI, and the destination UDI. The source UDI is a UDI of the first network device, and the destination UDI is a UDI of the target device or a broadcast UDI. It should be understood that, when the L2 ACP packet is a broadcast packet, the destination UDI in the L2 ACP packet may be empty. A value of the version field indicates a version of a protocol corresponding to the L2 ACP packet, for example, the version field has four bits in total. The flag bit field has four bits and is used to indicate that the L2 ACP packet is a neighbor unicast packet or a non-neighbor unicast packet or a broadcast packet, for example, a value of the flag bit field is 0001. A value of the protocol field is used to indicate a protocol of content carried in the data load field of the frame at the data link layer, and the protocol field has eight bits in total. For example, a value of a protocol field corresponding to the IP protocol may be used. The data packet length field has 16 bits in total, and a value of the data packet length field is used to indicate a length of the entire data packet.

A format of the L2 ACP packet encapsulated based on the frame at the data link layer is shown in Table 7:

TABLE 7

| Destination MAC address | Source MAC address | Type |
|---|---|---|
| Packet header | | |
| Packet content | | |

It may be learned from Table 7 that, a frame header of the frame at the data link layer includes the destination MAC address, the source MAC address, and the type field. The destination MAC address may be a MAC broadcast address or a MAC address of the target device, and the source MAC address is a MAC address of the first network device. A type value of the type field indicates that the data load field of the frame at the data link layer carries the data link layer-based autonomic control plane L2 ACP packet. Specifically, the type field may apply for a value of 0x88e7.

It should be understood that, after receiving the L2 ACP packet encapsulated based on the data link layer, a device at the data link layer can identify, by using the type value of the L2 ACP packet, that the L2 ACP packet is a packet transmitted in the ACP.

It should be understood that, Table 5, Table 6, and Table 7 are merely examples of the L2 ACP packet instead of limitations.

It should be understood that, in this embodiment of the application, all devices at the data link layer can identify the L2 ACP packet, that is, the L2 ACP packet can be effectively transmitted and received at the data link layer. For example, after receiving the L2 ACP packet that is encapsulated based on the frame at the data link layer and that is sent by a device 5, a device 2 performs decoding based on the frame at the data link layer, to obtain the L2 ACP packet, and further processes the L2 ACP packet, for example, parses a control message in the L2 ACP packet, or forwards the L2 ACP packet without processing the L2 ACP packet. Specifically, the control message may be control signaling that implements a control function and/or a management function.

Optionally, in this embodiment of the application, S310 in which a first network device generates a data link layer-based autonomic control plane L2 ACP packet includes the following step:

S311. The first network device generates the L2 ACP packet when the first network device needs to communicate with a target device in the autonomic network and determines that a neighbor list of the first network device includes a match item for a device identifier of the target device, where a packet header of the L2 ACP packet includes a flag bit field, a value of the flag bit field is used to indicate that the L2 ACP packet is a neighbor unicast packet, and the neighbor list of the first network device includes a device identifier and a data link layer address of a neighboring device of the first network device.

Specifically, for example, the first network device receives a communication task from an upper-layer autonomic functional entity. The communication task instructs the first network device to send a control message to the target device in the ACP. Specifically, the control message may be control signaling that implements a control function and/or a management function. It should be understood that, the first network device may obtain a device identifier and a MAC address of the target device from the upper-layer autonomic functional entity.

It should be understood that, that the neighbor list of the first network device includes a match item for a device identifier of the target device means that the neighbor list of the first network device includes a device identifier the same as the device identifier of the target device. It should be further understood that, when the device identifier of the target device is a broadcast device identifier, it may also be considered that the neighbor list of the first network device includes the match item for the device identifier of the target device. If the neighbor list of the first network device does not include a device identifier the same as the device identifier of the target device, and the device identifier of the target device is not a broadcast device identifier either, it is considered that the neighbor list of the first network device does not include the match item for the device identifier of the target device.

S320 in which the first network device encapsulates, based on a frame at a data link layer, the L2 ACP packet includes the following step:

S321. The first network device encapsulates, based on the frame at the data link layer, the L2 ACP packet, where the destination data link layer address of the frame at the data link layer is a data link layer address of the target device.

S330 in which the first network device sends, according to the destination data link layer address, the L2 ACP packet encapsulated based on the frame at the data link layer to a second network device includes the following step:

S331. The first network device sends, according to the data link layer address of the target device, the L2 ACP packet encapsulated based on the frame at the data link layer to the target device.

Specifically, if determining that the neighbor list includes a match item for a UDI of the target device, the first network device determines that a destination device of the L2 ACP packet is a neighboring device of the first network device, and generates the L2 ACP packet. The packet header of the L2 ACP packet includes a flag bit field used to indicate neighbor unicast.

Specifically, FIG. 2 is still used as an example. For example, a transmission task 1 delivered from an upper-layer autonomic functional entity is transmitting target signaling from the device 5 to the device 2 (which is a neighboring device of the device 5). The transmission task 1 carries a UDI of the device 5. The device 5 determines an L2 ACP packet according to the transmission task 1, and encapsulates, based on the frame at the data link layer, the L2 ACP packet. The L2 ACP packet includes the target signaling and a destination UDI, and the destination UDI is a UDI of the device 2. The destination MAC address of the frame at the data link layer is a MAC address of the device 2, and a flag bit field in a packet header of the L2 ACP packet is used to indicate neighbor unicast.

Specifically, in this embodiment of the application, a format of the L2 ACP packet is shown in Table 5, and the packet header of the L2 ACP packet is shown in Table 6. The destination UDI is the UDI of the target device. A value of the flag bit field is used to indicate that the L2 ACP packet is a neighbor unicast packet, that is, used to instruct a receiving device of the L2 ACP packet not to forward, to another device, the L2 ACP packet encapsulated based on the frame at the data link layer. For example, the value of the flag bit field is 0001. A format of the L2 ACP packet encapsulated based on the frame at the data link layer is shown in Table 7. The destination MAC address is the MAC address of the target device.

In this embodiment of the application, when it is determined that a target device is a neighboring device of a first network device, an L2 ACP packet is generated, and the L2 ACP packet includes a flag bit used to indicate that the L2 ACP packet is a neighbor unicast packet. Then, the L2 ACP packet is encapsulated based on a frame at a data link layer, and the L2 ACP packet encapsulated based on the frame at the data link layer is sent to a second network device according to the destination data link layer address. In this embodiment of the application, a packet may be transmitted in an ACP without depending on the IP protocol. This has better network compatibility in comparison with the prior art. In addition, the solution provided in this embodiment of the application may be applied to a network in which some devices are configured as IPv6 and some devices are configured as IPv4.

In addition, in this embodiment of the application, a network device can transmit an L2 ACP packet without maintaining a routing table.

Optionally, in this embodiment of the application, S310 in which the first network device generates a data link layer-based autonomic control plane L2 ACP packet includes the following step:

S312. The first network device generates the L2 ACP packet when the first network device needs to communicate with a target device in the autonomic network and determines that the neighbor list does not include a match item for a device identifier of the target device, where a packet header of the L2 ACP packet includes a flag bit field, and a value of the flag bit field is used to indicate that the L2 ACP packet is a non-neighbor unicast packet.

S320 in which the first network device encapsulates, based on a frame at a data link layer, the L2 ACP packet includes the following step:

S322. The first network device encapsulates, based on the frame at the data link layer, the L2 ACP packet, where the destination data link layer address of the frame at the data link layer is a broadcast data link layer address.

S330 in which the first network device sends, according to the destination data link layer address, the L2 ACP packet encapsulated based on the frame at the data link layer to a second network device includes the following step:

S332. The first network device sends, according to the broadcast data link layer address, the L2 ACP packet encapsulated based on the frame at the data link layer to the second network device.

Specifically, a format of the L2 ACP packet is shown in Table 5, and the packet header of the L2 ACP packet is shown in Table 6. The destination UDI is the UDI of the target device. A value of the flag bit field is used to indicate that the L2 ACP packet is a non-neighbor unicast packet, that is, used to instruct to continue to forward, when a device identifier of a receiving device of the L2 ACP packet does not match the destination device identifier, the L2 ACP packet encapsulated based on the frame at the data link layer to a neighboring device of the receiving device, and parse but not forward the L2 ACP packet when a device identifier of a receiving device of the L2 ACP packet matches the destination device identifier. For example, the value of the flag bit field is 0002. A format of the L2 ACP packet encapsulated based on the frame at the data link layer is shown in Table 7. The destination MAC address of the frame at the data link layer is a MAC broadcast address.

Specifically, FIG. 2 is used as an example. For example, a transmission task delivered from an upper-layer network functional entity is transmitting signaling from a device 7 to the device 2 (which is not a neighboring device of the device 7). In this case, the device 7 separately sends the L2 ACP packet encapsulated based on the frame at the data link layer to the device 5 and a device 6. The L2 ACP packet encapsulated based on the frame at the data link layer is shown in Table 7. The packet content includes signaling content that needs to be transmitted in actual. The source UDI is a UDI of the device 7, the destination UDI is the UDI of the device 2, and the flag bit is an identifier used to indicate that the packet is a non-neighbor unicast message.

Correspondingly, after receiving the L2 ACP packet sent by the device 7, the device 5 determines, by means of parsing, that the L2 ACP packet is a non-neighbor unicast message, and forwards the L2 ACP packet to the neighboring device 2 of the device 5 if detecting that the destination UDI does not match the UDI of the device 5. Similarly, after receiving the L2 ACP packet sent by the device 7, the device 6 determines, by means of parsing, that the L2 ACP packet is a non-neighbor unicast message, and forwards the L2 ACP packet to neighboring devices 2 and 8 of the device 6 if detecting that the destination UDI does not match a UDI of the device 6. After receiving the L2 ACP packet, the device 2 determines, by means of parsing, that the packet is a non-neighbor unicast message, and then parses content of the L2 ACP packet if detecting that the destination UDI matches the UDI of the device 2.

When a destination UDI specified in an upper-layer transmission requirement described in this embodiment of the application is not in a neighbor list of a device, a method for transmitting signaling between devices may be referred to as sending in a flood manner.

In this embodiment of the application, when it is determined that a target device is not a neighboring device of a first network device, an L2 ACP packet is generated, and the L2 ACP packet includes a flag bit used to indicate that the L2 ACP packet is a non-neighbor unicast packet. Then, the L2 ACP packet is encapsulated based on a frame at a data link layer, and the L2 ACP packet encapsulated based on the frame at the data link layer is sent to a second network device according to the destination data link layer address. In this embodiment of the application, a packet may be transmitted in an ACP without depending on the IP protocol. This has better network compatibility in comparison with the prior art. In addition, the solution provided in this embodiment of the application may be applied to a network in which some devices are configured as IPv6 and some devices are configured as IPv4.

In addition, in this embodiment of the application, a network device can transmit an L2 ACP packet without maintaining a routing table.

Optionally, in this embodiment of the application, the packet header of the L2 ACP packet further includes a packet ID used to uniquely indicate the L2 ACP packet.

Specifically, the packet header of the L2 ACP packet is shown in Table 8:

TABLE 8

| Version | Flag bit | Protocol | Data packet length |
|---|---|---|---|
| Packet ID | | | Timing information |
| | Source UDI | | |
| | Destination UDI | | |

Specifically, the packet ID is a unique character string on a generation device of the L2 ACP packet. The packet ID is used by a receiving device to detect whether the receiving device has received a same packet. Specifically, for example, in the foregoing example, after receiving the L2 ACP packet sent by the device 7, the device 6 determines, by means of parsing, that the L2 ACP packet is a non-neighbor unicast message, and forwards the L2 ACP packet to the neighboring devices 2 and 8 of the device 6 if detecting that the destination UDI does not match the UDI of the device 6. In this case, the device 2 repeatedly receives, from the neighboring devices 5 and 6 of the device 2, the L2 ACP packet from the device 7. If the L2 ACP packet includes the packet ID, the device 2 can be prevented from repeatedly processing a same L2 ACP packet. For example, when the device 2 first receives the L2 ACP packet sent by the neighboring device 5, the device 2 buffers the L2 ACP packet after parsing the L2 ACP packet, and also stores the packet ID of the L2 ACP packet. When receiving the L2 ACP packet, from the device 7, sent by the device 6, the device 2 parses the L2 ACP packet, and can perform a discard operation on the L2 ACP packet if detecting that the device 2 has received the L2 ACP packet.

In this embodiment of the application, the L2 ACP packet includes the packet ID, so that repeated signaling forwarding can be avoided.

It should be understood that, descriptions of the version field, the flag bit field, the protocol field, the data packet length field, the source UDI, and the destination UDI in Table 8 are consistent with the descriptions in the foregoing Table 6, and details are not described herein again.

Optionally, in this embodiment of the application, the packet header of the L2 ACP packet further includes timing information. The timing information is used to instruct the receiving device of the L2 ACP packet to clear the L2 ACP packet when a time for buffering the L2 ACP packet exceeds preset duration.

Specifically, as shown in Table 8, the packet header of the L2 ACP packet has a timing information field. A value of the timing information field is used to instruct the receiving device of the L2 ACP packet to clear the L2 ACP packet when the time for buffering the L2 ACP packet exceeds the preset duration.

Specifically, for example, the timing information is a timer. A specific time value may be preconfigured according to a service requirement or a specific case. For example, the device 5 receives the L2 ACP packet from the device 7, and buffers the L2 ACP packet. After buffering duration exceeds a threshold, the device 5 may consider that the L2 ACP packet has been transmitted to a device corresponding to the destination UDI, that is, transmission of the L2 ACP packet ends, and the device 5 may delete the L2 ACP packet. Optionally, the timing information may be a time stamp.

In this embodiment of the application, the L2 ACP packet includes the timing information, so that a device can clear, in a timely manner, an L2 ACP packet that has been transmitted, and the device can be prevented from buffering a useless L2 ACP packet for a long time.

Optionally, in this embodiment of the application, S310 in which the first network device generates an L2 ACP packet includes the following step:

S313. The first network device generates the L2 ACP packet when the first network device needs to broadcast a control message in the ACP, where a packet header of the L2 ACP packet includes a flag bit field, and a value of the flag bit field is used to indicate that the L2 ACP packet is a broadcast packet.

S320 in which the first network device encapsulates, based on a frame at a data link layer, the L2 ACP packet includes the following step:

S323. The first network device encapsulates, based on the frame at the data link layer, the L2 ACP packet, where the destination data link layer address of the frame at the data link layer is a broadcast data link layer address.

S330 in which the first network device sends, according to the destination data link layer address, the L2 ACP packet encapsulated based on the frame at the data link layer to a second network device includes the following step:

S333. The first network device sends, according to the broadcast data link layer address, the L2 ACP packet encapsulated based on the frame at the data link layer to the second network device.

Specifically, a format of the L2 ACP packet is shown in Table 5, and the packet header of the L2 ACP packet is shown in Table 6. A value of the flag bit field is used to indicate that the L2 ACP packet is a broadcast packet, that is, used to instruct a receiving device of the L2 ACP packet to parse the L2 ACP packet, and forward the L2 ACP packet encapsulated based on the frame at the data link layer to a neighboring device of the receiving device. For example, the value of the flag bit field is 0003.

Specifically, for example, the first network device receives a communication task from an upper-layer autonomic functional entity. The communication task instructs the first network device to broadcast a control message in the ACP. Specifically, the control message may be control signaling that implements a control function and/or a management function. FIG. 2 is still used as an example. For example, a task delivered from the upper-layer network functional entity is broadcasting an L2 ACP packet from the device 6. The L2 ACP packet generated by the device 6 is shown in Table 5 and Table 6. A value of a flag bit field of a packet header of the L2 ACP packet is used to indicate a broadcast packet. The L2 ACP packet is encapsulated based on the frame at the data link layer. The destination MAC address of the frame at the data link layer is a MAC broadcast address. A neighboring device of the device 6 receives the L2 ACP packet, determines, by means of parsing, that the L2 ACP packet is a broadcast packet, and continues to forward the L2 ACP packet to the neighboring devices 2, 7, and 8 of the device 6. Similarly, the devices 2, 7, and 8 continue to forward the L2 ACP packet to neighboring devices of the devices 2, 7, and 8.

It should be understood that, when the L2 ACP packet is a broadcast packet, the destination UDI in the packet header may be a broadcast UDI, or the destination UDI is empty.

In this embodiment of the application, the L2 ACP packet is generated when a control message needs to be broadcast. The L2 ACP packet includes a flag bit used to indicate that the L2 ACP packet is a broadcast packet. Then, the L2 ACP packet is encapsulated based on the frame at the data link layer, and the L2 ACP packet encapsulated based on the frame at the data link layer is sent to the second network device according to the destination data link layer address. In this embodiment of the application, a packet may be transmitted in an ACP without depending on the IP protocol. This has better network compatibility in comparison with the prior art.

In addition, in this embodiment of the application, a network device can transmit an L2 ACP packet without maintaining a routing table.

Optionally, in this embodiment of the application, the packet header of the L2 ACP packet further includes a packet ID used to uniquely indicate the L2 ACP packet.

Specifically, the packet header of the L2 ACP packet is shown in Table 8.

Specifically, the packet ID is a unique character string on a generation device of the L2 ACP packet. The packet ID is used by a receiving device to detect whether the receiving device has received a same packet. Specifically, for example, in the foregoing example, after receiving the L2 ACP packet sent by the device 7, the device 6 determines, by means of parsing, that the L2 ACP packet is a non-neighbor unicast message, and forwards the L2 ACP packet to the neighboring devices 2 and 8 of the device 6 if detecting that the destination UDI does not match the UDI of the device 6. In this case, the device 2 repeatedly receives, from the neighboring devices 5 and 6 of the device 2, the L2 ACP packet from the device 7. If the L2 ACP packet includes the packet ID, the device 2 can be prevented from repeatedly processing a same L2 ACP packet. For example, when the device 2 first receives the L2 ACP packet sent by the neighboring device 5, the device 2 buffers the L2 ACP packet after parsing the L2 ACP packet, and also stores the packet ID of the L2 ACP packet. When receiving the L2 ACP packet, from the device 7, sent by the device 6, the device 2 parses the L2 ACP packet, and can perform a discard operation on the L2 ACP packet if detecting that the device 2 has received the L2 ACP packet.

In this embodiment of the application, the L2 ACP packet includes the packet ID, so that repeated signaling forwarding can be avoided.

Optionally, in this embodiment of the application, the packet header of the L2 ACP packet further includes timing information. The timing information is used to instruct the receiving device of the L2 ACP packet to clear the L2 ACP packet when a time for buffering the L2 ACP packet exceeds preset duration.

Specifically, as shown in Table 8, the packet header of the L2 ACP packet has a timing information field. A value of the timing information field is used to instruct the receiving device of the L2 ACP packet to clear the L2 ACP packet when the time for buffering the L2 ACP packet exceeds the preset duration.

Specifically, for example, the timing information is a timer. A specific time value may be preconfigured according to a service requirement or a specific case. For example, the device 5 receives the L2 ACP packet from the device 7, and buffers the L2 ACP packet. After buffering duration exceeds a threshold, the device 5 may consider that the L2 ACP packet has been transmitted to a device corresponding to the destination UDI, that is, transmission of the L2 ACP packet ends, and the device 5 may delete the L2 ACP packet. Optionally, the timing information may be a time stamp.

In this embodiment of the application, the L2 ACP packet includes the timing information, so that a device can clear, in a timely manner, an L2 ACP packet that has been transmitted, and the device can be prevented from buffering a useless L2 ACP packet for a long time.

It should be understood that, in this embodiment of the application, all devices at the data link layer can identify the L2 ACP packet, that is, the L2 ACP packet can be effectively transmitted and received at the data link layer. For example, after receiving the L2 ACP packet that is encapsulated based on the frame at the data link layer and that is sent by the device 5, the device 2 performs decoding based on the frame at the data link layer, to obtain the L2 ACP packet, matches the destination UDI in the L2 ACP packet and the UDI of the device 2, and after matching is successful, obtains, by means of parsing, target signaling in the L2 ACP packet.

It should be understood that, in this embodiment of the application, both a packet format of the L2 ACP packet and a frame format of the frame, at the data link layer, used for encapsulating the L2 ACP packet are publicly known to a receive/transmit end device at the data link layer, that is, all the devices at the data link layer can identify the L2 ACP packet.

In this embodiment of the application, an L2 ACP packet is encapsulated based on a frame at a data link layer, and the L2 ACP packet encapsulated based on the frame at the data link layer is sent to a second network device according to the destination data link layer address. In this embodiment of the application, a packet may be transmitted in an ACP without depending on the IP protocol. This has better network compatibility in comparison with the prior art.

Further, in this embodiment of the application, an L2 ACP packet is transmitted between network devices based on a device identifier (such as a UDI) of a target device and neighbor lists of the network devices instead of depending on a loopback address, so that the network devices do not need to maintain a routing table. Each network device has a UDI and a neighbor list of the network device, and transmits signaling by directly using a ready-made resource, so that maintenance costs can be reduced.

In addition, in this embodiment of the application, both an autonomic network and packet transmission in the autonomic network may be imperceptive of the IP protocol, so that it is not necessarily required that all network devices support IPv6 or IPv4. This has better network compatibility in comparison with the prior art, and also reduces difficulties in autonomic network deployment.

Optionally, in this embodiment of the application, each network device in the autonomic network has an IP address, and each autonomic device has a mapping relationship between a device identifier of each autonomic device and the IP address of each autonomic device.

S310 in which a first network device generates a data link layer-based autonomic control plane L2 ACP packet includes the following step:

S314. The first network device generates the L2 ACP packet when the first network device needs to communicate with a target device in the ACP by using an IP session, where the L2 ACP packet further includes a destination IP address, and the destination IP address is an IP address of the target device.

Specifically, a format of the L2 ACP packet is shown in Table 5 and Table 6. A value of a protocol field in the packet header of the L2 ACP packet may use a value of a protocol field in an IP packet.

Specifically, for example, some upper-layer services such as a Remote Authentication Dial In User Service (RADIUS) strictly requires that signaling is transmitted based on IP or TCP/UDP.

In this embodiment of the application, each autonomic device in the ACP supports a non-repeated self-configured loopback (Loopback) address, and each autonomic device in the ACP supports mapping of a UDI and an IP (including mapping of a UDI and an IP of each autonomic device and mapping of a UDI and an IP of a peer device).

Specifically, for example, if a transmission requirement of an upper-layer autonomic agent (Agent) specifies that an IP session needs to be established, a related serving device (such as AAA) needs to send an IP address of a server of the serving device and a UDI of the serving device to a customer device. This phase is referred to as self-service discovery or service advertisement.

After receiving a message sent by the serving device, the customer device binds the IP address, the UDI, and a related service, and initiates an IP session to the server by using a self-configured IPv6 ULA loopback address or IPv4 loopback address.

After receiving a related packet, a UDI layer of the server binds an IP and a UDI of the customer device.

Subsequently, in ACP communication between the server and a client, after encapsulating an IP packet, the server/client searches for a mapping table of the IP and the UDI, and forwards the IP packet in the ACP plane based on the UDI.

In the scenario involved in this embodiment of the application, although it appears that an IP session is initiated, in the ACP plane, between upper-layer device applications, forwarding based on IP is not provided in the ACP plane, and a network device does not need to maintain a related routing table.

Therefore, the ACP provided in this embodiment of the application can provide an IP-based communication capability, so that better compatibility can be provided for the upper-layer applications, and the upper-layer applications use an L2-layer-based ACP without perceiving a forwarding manner as much as possible.

In this embodiment of the application, an L2 ACP packet is encapsulated based on a frame at a data link layer, and the L2 ACP packet encapsulated based on the frame at the data link layer is sent to a second network device according to the destination data link layer address. In this embodiment of the application, a packet may be transmitted in an ACP without depending on the IP protocol. This has better network compatibility in comparison with the prior art.

Further, in this embodiment of the application, an L2 ACP packet is transmitted between network devices based on a device identifier (such as a UDI) of a target device and neighbor lists of the network devices instead of depending on a loopback address, so that the network devices do not need to maintain a routing table. Each network device has a UDI and a neighbor list of the network device, and transmits signaling by directly using a ready-made resource, so that maintenance costs can be reduced.

In addition, in this embodiment of the application, both an autonomic network and packet transmission in the autonomic network may be imperceptive of the IP protocol, so that it is not necessarily required that all network devices support IPv6 or IPv4. This has better network compatibility in comparison with the prior art, and also reduces difficulties in autonomic network deployment.

FIG. 5 shows a schematic flowchart of a data link layer-based communication method 400 according to an embodiment of the application. An autonomic control plane ACP of the autonomic network is established based on a data link layer, each autonomic device in the autonomic network has a neighbor list, and the neighbor list includes a device identifier and a data link layer address of a neighboring device of each autonomic device. The method 400 includes the following steps.

S410. A second network device receives an L2 ACP packet that is encapsulated based on a frame at a data link layer and that is sent by a first network device, where the L2 ACP packet includes a destination device identifier, the frame at the data link layer includes a source data link layer address and a destination data link layer address, the source data link layer address is a data link layer address of the first network device, the destination data link layer address matches a data link layer address of the second network device, and both the second network device and the first network device are autonomic devices in the autonomic network.

It should be understood that, that the destination data link layer address matches a data link layer address of the second network device means that the destination data link layer address is the data link layer address of the second network device, or that the destination data link layer address is a broadcast data link layer address. It should be understood that, it may be considered that the broadcast data link layer address matches any fixed data link layer address.

S420. The second network device processes the L2 ACP packet by determining whether a device identifier of the second network device matches the destination device identifier in the L2 ACP packet.

It should be understood that, when the destination device identifier is the device identifier of the second network device, or the destination device identifier is a broadcast device identifier, it may be considered that the destination device identifier matches the device identifier of the second network device. When the destination device identifier is not the device identifier of the second network device, and the destination device identifier is not a broadcast device identifier, the destination device identifier does not match the device identifier of the second network device.

An L2 ACP packet in this embodiment of the application is encapsulated based on a frame at a data link layer. The L2 ACP packet may be transmitted in an ACP based on a destination data link layer address of the L2 ACP packet. That is, in this embodiment of the application, communication based on the ACP may not depend on the IP protocol. This has better network compatibility in comparison with the prior art. In addition, unlike the prior art, in this embodiment of the application, a network device may not need to maintain a routing table.

It should be understood that, the autonomic control plane ACP in this embodiment of the application is established based on the data link layer. For a specific establishment process, refer to the foregoing descriptions in the method 100 and the method 200. Details are not described herein again.

It should be further understood that, in this embodiment of the application, the L2 ACP packet is encapsulated based on a frame at an L2, and is not encapsulated based on an IP packet at a network layer any longer. That is, in this embodiment of the application, the L2 ACP packet may be transmitted by using a forwarding table resource (such as a MAC forwarding table) at the data link layer without depending on the IP protocol at the network layer or an IP routing table.

It should be further understood that, in this embodiment of the application, a MAC forwarding table resource at the L2 may be a neighbor list that each device has. For example, a neighbor list of a device A includes a device identifier and a MAC address of a neighboring device of the device A. Therefore, when the device A needs to send an L2 ACP packet, the device A determines a destination MAC address of the L2 ACP packet based on the MAC address of the neighboring device (one or more) included in the neighbor list, so as to send the L2 ACP packet to a corresponding neighboring device. Alternatively, the device A sets a destination MAC address of the L2 ACP packet to a MAC broadcast address, and then sends the MAC packet by using an interface between the device A and the neighboring device. It should be understood that, it is considered that the MAC broadcast address matches any MAC address. Therefore, all neighboring devices of the device A can receive the L2 ACP packet.

In conclusion, unlike the prior art, in this embodiment of the application, signaling is transmitted in the ACP without depending on the IP protocol or an IP routing table, and the IP protocol or an IP address may not be perceived. This has better network compatibility in comparison with the prior art.

Optionally, in this embodiment of the application, the data link layer address is a Media Access Control (MAC) address.

In all the following examples, an example in which the data link layer address is a MAC address is used for description.

Optionally, in this embodiment of the application, the device identifier is a unique device identifier UDI or a secure unique device identification SUDI.

Optionally, in this embodiment of the application, the frame at the data link layer is a frame that conforms to a definition in the Ethernet protocol, and a type value of a type field of the frame at the data link layer indicates that a data load field of the frame at the data link layer carries the L2 ACP packet.

Specifically, for example, the type value of the type field of the frame at the data link layer is 0x88e7.

Optionally, in this embodiment of the application, a packet header of the L2 ACP packet further includes a version field, a protocol field, and a data packet length field.

Specifically, the L2 ACP packet is shown in Table 5, the packet header of the L2 ACP packet is shown in Table 6, and the L2 ACP packet encapsulated based on the frame at the data link layer is shown in Table 7. For specific descriptions, refer to the foregoing related content. Details are not described herein again.

It should be understood that, in this embodiment of the application, all devices at the data link layer can identify the L2 ACP packet, that is, the L2 ACP packet can be effectively transmitted and received at the data link layer. For example, after receiving the L2 ACP packet that is encapsulated based on the frame at the data link layer and that is sent by a device 5, a device 2 performs decoding based on the frame at the data link layer, to obtain the L2 ACP packet, and further processes the L2 ACP packet, for example, parses a control message in the L2 ACP packet, or forwards the L2 ACP packet without processing the L2 ACP packet. Specifically, the control message may be control signaling that implements a control function and/or a management function.

Optionally, in this embodiment of the application, the packet header of the L2 ACP packet includes a flag bit field, and a value of the flag bit field is used to indicate that the L2 ACP packet is a neighbor unicast packet. The destination data link layer address of the frame at the data link layer is a data link layer address of the target device.

S420 in which the second network device processes the L2 ACP packet by determining whether a device identifier of the second network device matches the destination device identifier in the L2 ACP packet includes the following step:

S421. The second network device determines that the destination device identifier is the device identifier of the second network device, and parses the L2 ACP packet.

Specifically, the L2 ACP packet is parsed to obtain packet content such as a control message in the L2 ACP packet. Specifically, the control message may be control signaling that implements a control function and/or a management function. It should be understood that, in this embodiment of the application, a receiving device of the L2 ACP packet does not forward the L2 ACP packet to a neighboring device of the receiving device.

Specifically, in this embodiment of the application, a format of the L2 ACP packet is shown in Table 5, and the packet header of the L2 ACP packet is shown in Table 6. The destination UDI is a UDI of the target device. A value of the flag bit field is used to indicate that the L2 ACP packet is a neighbor unicast packet, that is, used to instruct the receiving device of the L2 ACP packet not to forward, to another device, the L2 ACP packet encapsulated based on the frame at the data link layer. For example, the value of the flag bit field is 0001. A format of the L2 ACP packet encapsulated based on the frame at the data link layer is shown in Table 7. The destination MAC address is a MAC address of the target device.

Optionally, in this embodiment of the application, the packet header of the L2 ACP packet includes a flag bit field, and a value of the flag bit field is used to indicate that the L2 ACP packet is a non-neighbor unicast packet. The destination data link layer address of the frame at the data link layer is a broadcast data link layer address.

S420 in which the second network device processes the L2 ACP packet by determining whether a device identifier of the second network device matches the destination device identifier in the L2 ACP packet includes the following step:

S422. When determining that the device identifier of the second network device matches the destination device identifier, the second network device parses the L2 ACP packet, and buffers the L2 ACP packet.

Specifically, the L2 ACP packet is parsed to obtain packet content such as a control message in the L2 ACP packet. Specifically, the control message may be control signaling that implements a control function and/or a management function.

S423. When determining that the device identifier of the second network device does not match the destination device identifier, the second network device buffers the L2 ACP packet, and forwards, according to the destination data link layer address of the frame at the data link layer, the L2 ACP packet encapsulated based on the frame at the data link layer to a neighboring device of the second network device.

Specifically, a format of the L2 ACP packet is shown in Table 5, and the packet header of the L2 ACP packet is shown in Table 6. The destination UDI is a UDI of the target device. A value of the flag bit field is used to indicate that the L2 ACP packet is a non-neighbor unicast packet, that is, used to instruct to continue to forward, when a device identifier of a receiving device of the L2 ACP packet does not match the destination device identifier, the L2 ACP packet encapsulated based on the frame at the data link layer to a neighboring device of the receiving device, and parse but not forward the L2 ACP packet when a device identifier of a receiving device of the L2 ACP packet matches the destination device identifier. For example, the value of the flag bit field is 0002. A format of the L2 ACP packet encapsulated based on the frame at the data link layer is shown in Table 7. The destination MAC address of the frame at the data link layer is a MAC broadcast address.

Specifically, FIG. 2 is used as an example. For example, a transmission task delivered from an upper-layer network functional entity is transmitting signaling from a device 7 to the device 2 (which is not a neighboring device of the device 7). In this case, the device 7 separately sends the L2 ACP packet encapsulated based on the frame at the data link layer to the device 5 and a device 6. The L2 ACP packet encapsulated based on the frame at the data link layer is shown in Table 7. The packet content includes signaling content that needs to be transmitted in actual. The source UDI is a UDI of the device 7, the destination UDI is a UDI of the device 2, and the flag bit is an identifier used to indicate that the packet is a non-neighbor unicast message.

Correspondingly, after receiving the L2 ACP packet sent by the device 7, the device 5 determines, by means of parsing, that the L2 ACP packet is a non-neighbor unicast message, and forwards the L2 ACP packet to the neighboring device 2 of the device 5 if detecting that the destination UDI does not match a UDI of the device 5. Similarly, after receiving the L2 ACP packet sent by the device 7, the device 6 determines, by means of parsing, that the L2 ACP packet is a non-neighbor unicast message, and forwards the L2 ACP packet to neighboring devices 2 and 8 of the device 6 if detecting that the destination UDI does not match a UDI of the device 6. After receiving the L2 ACP packet, the device 2 determines, by means of parsing, that the packet is a non-neighbor unicast message, and then parses content of the L2 ACP packet if detecting that the destination UDI matches the UDI of the device 2.

When a destination UDI specified in an upper-layer transmission requirement described in this embodiment of the application is not in a neighbor list of a device, a method for transmitting signaling between devices may be referred to as sending in a flood manner.

In this embodiment of the application, a packet may be transmitted in an ACP without depending on the IP protocol. This has better network compatibility in comparison with the prior art. In addition, the solution provided in this embodiment of the application may be applied to a network in which some devices are configured as IPv6 and some devices are configured as IPv4.

In addition, in this embodiment of the application, a network device can transmit an L2 ACP packet without maintaining a routing table.

Optionally, in this embodiment of the application, the packet header of the L2 ACP packet further includes a packet ID used to uniquely identify the L2 ACP packet.

S420 in which the second network device processes the L2 ACP packet by determining whether a device identifier of the second network device matches the destination device identifier in the L2 ACP packet includes the following step:

S425. When determining that the second network device does not buffer the packet ID, the second network device processes the L2 ACP packet by determining whether the device identifier of the second network device matches the destination device identifier.

Specifically, the packet header of the L2 ACP packet is shown in Table 8.

Specifically, the packet ID is a unique character string on a source device. The packet ID is used by a receiving device to detect whether the receiving device has received a same packet. Specifically, for example, if a device receives an L2 ACP packet, and determines that the device does not buffer a packet ID of the L2 ACP packet, that is, the device receives the L2 ACP packet for the first time, the device parses packet content and buffers the packet ID, and then forwards the L2 ACP packet to a neighboring device. If a device receives an L2 ACP packet, and determines that the device has buffered a packet ID of the L2 ACP packet, the device considers that the L2 ACP packet is not received for the first time, and may discard the packet. Similar to the second case, after a device receives an L2 ACP packet, the device may delete the L2 ACP packet after a time indicated by a time stamp is expired. Specifically, for example, in the foregoing example, after receiving the L2 ACP packet sent by the device 7, the device 6 determines, by means of parsing, that the L2 ACP packet is a non-neighbor unicast message, and forwards the L2 ACP packet to the neighboring devices 2 and 8 of the device 6 if detecting that the destination UDI does not match the UDI of the device 6. In this case, the device 2 repeatedly receives, from the neighboring devices 5 and 6 of the device 2, the L2 ACP packet from the device 7. If the L2 ACP packet includes the packet ID, the device 2 can be prevented from repeatedly processing a same L2 ACP packet. For example, when the device 2 first receives the L2 ACP packet sent by the neighboring device 5, the device 2 buffers the L2 ACP packet after parsing the L2 ACP packet, and also stores the packet ID of the L2 ACP packet. When receiving the L2 ACP packet, from the device 7, sent by the device 6, the device 2 parses the L2 ACP packet, and can perform a discard operation on the L2 ACP packet if detecting that the device 2 has received the L2 ACP packet.

Therefore, in this embodiment of the application, before it is verified whether the device identifier in the L2 ACP packet matches the device identifier of the second network device, it is first verified, according to the packet ID, whether the second network device has received the L2 ACP packet (that is, it is detected whether the second network device has buffered the packet ID). If it is determined that the L2 ACP packet is not received before, subsequent determining of a device identifier is performed. If it is determined that the L2 ACP packet is received before, the L2 ACP packet may be discarded.

The L2 ACP packet includes the packet ID, so that repeated signaling forwarding can be avoided.

Optionally, in this embodiment of the application, the packet header of the L2 ACP packet further includes timing information. The timing information is used to instruct the receiving device of the L2 ACP packet to clear the L2 ACP packet when a time for buffering the L2 ACP packet exceeds preset duration.

The method 400 further includes the following step:

S430. The second network device clears the L2 ACP packet when determining that the time for buffering the L2 ACP packet exceeds the preset duration indicated by the timing information.

Specifically, for example, the timing information is a timer. A specific time value may be preconfigured according to a service requirement or a specific case. For example, after receiving the L2 ACP packet from the device 7, the device 5 starts to time according to the time stamp. After a timing time exceeds a threshold, the device 5 may consider that the L2 ACP packet has been transmitted to a device corresponding to the destination UDI, that is, transmission of the L2 ACP packet ends, and the device 5 may delete the L2 ACP packet. The timing information may also be specifically a time stamp.

In this embodiment of the application, the L2 ACP packet includes the timing information, so that a device can clear, in a timely manner, an L2 ACP packet that has been transmitted, and the device can be prevented from buffering a useless L2 ACP packet for a long time.

Optionally, in this embodiment of the application, the packet header of the L2 ACP packet further includes a flag bit field, and a value of the flag bit field is used to indicate that the L2 ACP packet is a broadcast packet. The destination data link layer address of the frame at the data link layer is a broadcast data link layer address.

S420 in which the second network device processes the L2 ACP packet by determining whether a device identifier of the second network device matches the destination device identifier in the L2 ACP packet includes the following step:

S424. When determining that the device identifier of the second network device does not match the destination device identifier, the second network device parses the L2 ACP packet, buffers the L2 ACP packet, and forwards, according to the destination data link layer address of the frame at the data link layer, the L2 ACP packet encapsulated based on the frame at the data link layer to a neighboring device of the second network device.

Specifically, a format of the L2 ACP packet is shown in Table 5, and the packet header of the L2 ACP packet is shown in Table 6. A value of the flag bit field is used to indicate that the L2 ACP packet is a broadcast packet, that is, used to instruct a receiving device of the L2 ACP packet to parse the L2 ACP packet, and forward the L2 ACP packet encapsulated based on the frame at the data link layer to a neighboring device of the receiving device. For example, the value of the flag bit field is 0003.

It should be understood that, in this embodiment of the application, the L2 ACP packet is a broadcast packet, and the destination device identifier in the L2 ACP packet may be a broadcast device identifier. In this case, after receiving the L2 ACP packet, any network device in the autonomic network determines that a device identifier of the network device matches the destination device identifier.

It should be further understood that, when the L2 ACP packet is a broadcast packet, the L2 ACP packet may not include the destination device identifier. If determining, according to a flag bit of the L2 ACP packet, that the L2 ACP packet is a broadcast packet, the network device parses and forwards the L2 ACP packet without determining whether device identifiers are matched.

Specifically, FIG. 2 is still used as an example. For example, a task delivered from an upper-layer network functional entity is broadcasting an L2 ACP packet from the device 6. The L2 ACP packet generated by the device 6 is shown in Table 5 and Table 6. A value of a flag bit field of a packet header of the L2 ACP packet is used to indicate a broadcast packet. The L2 ACP packet is encapsulated based on the frame at the data link layer. The destination MAC address of the frame at the data link layer is a MAC broadcast address. A neighboring device of the device 6 receives the L2 ACP packet, determines, by means of parsing, that the L2 ACP packet is a broadcast packet, and continues to forward the L2 ACP packet to the neighboring devices 2, 7, and 8 of the device 6. Similarly, the devices 2, 7, and 8 continue to forward the L2 ACP packet to neighboring devices of the devices 2, 7, and 8.

Optionally, in this embodiment of the application, the packet header of the L2 ACP packet further includes a packet ID used to uniquely identify the L2 ACP packet.

S420 in which the second network device processes the L2 ACP packet by determining whether a device identifier of the second network device matches the destination device identifier in the L2 ACP packet includes the following step:

S425. When determining that the second network device does not buffer the packet ID, the second network device processes the L2 ACP packet by determining whether the device identifier of the second network device matches the destination device identifier.

Specifically, the packet header of the L2 ACP packet is shown in Table 8.

Specifically, the packet ID is a unique character string on a source device. The packet ID is used by a receiving device to detect whether the receiving device has received a same packet. Specifically, for example, if a device receives an L2 ACP packet, and determines that the device does not buffer a packet ID of the L2 ACP packet, that is, the device receives the L2 ACP packet for the first time, the device parses packet content and buffers the packet ID, and then forwards the L2 ACP packet to a neighboring device. If a device receives an L2 ACP packet, and determines that the device has buffered a packet ID of the L2 ACP packet, the device considers that the L2 ACP packet is not received for the first time, and may discard the packet. Similar to the second case, after a device receives an L2 ACP packet, the device may delete the L2 ACP packet after a time indicated by a time stamp is expired. Specifically, for example, in the foregoing example, after receiving the L2 ACP packet sent by the device 7, the device 6 determines, by means of parsing, that the L2 ACP packet is a non-neighbor unicast message, and forwards the L2 ACP packet to the neighboring devices 2 and 8 of the device 6 if detecting that the destination UDI does not match the UDI of the device 6. In this case, the device 2 repeatedly receives, from the neighboring devices 5 and 6 of the device 2, the L2 ACP packet from the device 7. If the L2 ACP packet includes the packet ID, the device 2 can be prevented from repeatedly processing a same L2 ACP packet. For example, when the device 2 first receives the L2 ACP packet sent by the neighboring device 5, the device 2 buffers the L2 ACP packet after parsing the L2 ACP packet, and also stores the packet ID of the L2 ACP packet. When receiving the L2 ACP packet, from the device 7, sent by the device 6, the device 2 parses the L2 ACP packet, and can perform a discard operation on the L2 ACP packet if detecting that the device 2 has received the L2 ACP packet.

Therefore, in this embodiment of the application, before verifying whether the device identifier in the L2 ACP packet matches the device identifier of the second network device, the second network device first verifies, according to the packet ID, whether the second network device has received the L2 ACP packet (that is, detects whether the second network device has buffered the packet ID). If determining that the L2 ACP packet is not received before, the second network device performs subsequent determining of a device identifier. If determining that the L2 ACP packet is received before, the second network device may discard the L2 ACP packet.

The L2 ACP packet includes the packet ID, so that repeated signaling forwarding can be avoided.

Optionally, in this embodiment of the application, the packet header of the L2 ACP packet further includes timing information. The timing information is used to instruct the receiving device of the L2 ACP packet to clear the L2 ACP packet when a time for buffering the L2 ACP packet exceeds preset duration.

The method 400 further includes the following step:

S430. The second network device clears the L2 ACP packet when determining that the time for buffering the L2 ACP packet exceeds the preset duration indicated by the timing information.

Specifically, the packet header of the L2 ACP packet is shown in Table 8:

Specifically, for example, the timing information is a timer. A specific time value may be preconfigured according to a service requirement or a specific case. For example, after receiving the L2 ACP packet from the device 7, the device 5 starts to time according to the time stamp. After a timing time exceeds a threshold, the device 5 may consider that the L2 ACP packet has been transmitted to a device corresponding to the destination UDI, that is, transmission of the L2 ACP packet ends, and the device 5 may delete the L2 ACP packet. The timing information may also be specifically a time stamp.

In this embodiment of the application, the L2 ACP packet includes the timing information, so that a device can clear, in a timely manner, an L2 ACP packet that has been transmitted, and the device can be prevented from buffering a useless L2 ACP packet for a long time.

In this embodiment of the application, an L2 ACP packet is encapsulated based on a frame at a data link layer, and the L2 ACP packet encapsulated based on the frame at the data link layer is sent to a second network device according to the destination data link layer address. In this embodiment of the application, a packet may be transmitted in an ACP without depending on the IP protocol. This has better network compatibility in comparison with the prior art.

Further, in this embodiment of the application, an L2 ACP packet is transmitted between network devices based on a device identifier (such as a UDI) of a target device and neighbor lists of the network devices instead of depending on a loopback address, so that the network devices do not need to maintain a routing table. Each network device has a UDI and a neighbor list of the network device, and transmits signaling by directly using a ready-made resource, so that maintenance costs can be reduced.

In addition, in this embodiment of the application, both an autonomic network and packet transmission in the autonomic network may be imperceptive of the IP protocol, so that it is not necessarily required that all network devices support IPv6 or IPv4. This has better network compatibility in comparison with the prior art, and also reduces difficulties in autonomic network deployment.

Optionally, in this embodiment of the application, each network device in the autonomic network has an IP address, and each autonomic device has a mapping relationship between a device identifier of each autonomic device and the IP address of each autonomic device. The L2 ACP packet further includes a destination IP address.

S420 in which the second network device processes the L2 ACP packet by determining whether a device identifier of the second network device matches the destination device identifier in the L2 ACP packet includes the following step:

S426. When determining that the device identifier of the second network device does not match the destination device identifier in the L2 ACP packet, the second network device forwards the L2 ACP packet to a neighboring device of the second network device according to the destination data link layer address of the L2 ACP packet.

S427. The second network device parses the L2 ACP packet when determining that the device identifier of the second network device matches the destination device identifier in the L2 ACP packet and that an IP address of the second network device matches the destination IP address of the L2 ACP packet.

Specifically, a format of the L2 ACP packet is shown in Table 5 and Table 6. A value of a protocol field in the packet header of the L2 ACP packet may use a value of a protocol field in an IP packet.

Specifically, for example, some upper-layer services such as a Remote Authentication Dial In User Service (RADIUS) strictly requires that signaling is transmitted based on IP or TCP/UDP.

In this embodiment of the application, each autonomic device in the ACP supports a non-repeated self-configured loopback (Loopback) address, and each autonomic device in the ACP supports mapping of a UDI and an IP (including mapping of a UDI and an IP of each autonomic device and mapping of a UDI and an IP of a peer device).

Specifically, for example, if a transmission requirement of an upper-layer autonomic agent (Agent) specifies that an IP session needs to be established, a related serving device (such as AAA) needs to send an IP address of a server of the serving device and a UDI of the serving device to a customer device. This phase is referred to as self-service discovery or service advertisement.

After receiving a message sent by the serving device, the customer device binds the IP address, the UDI, and a related service, and initiates an IP session to the server by using a self-configured IPv6 ULA loopback address or IPv4 loopback address.

After receiving a related packet, a UDI layer of the server binds an IP and a UDI of the customer device.

Subsequently, in ACP communication between the server and a client, after encapsulating an IP packet, the server/client searches for a mapping table of the IP and the UDI, and forwards the IP packet in the ACP plane based on the UDI.

In the scenario involved in this embodiment of the application, although it appears that an IP session is initiated, in the ACP plane, between upper-layer device applications, forwarding based on IP is not provided in the ACP plane, and a network device does not need to maintain a related routing table.

Therefore, the ACP provided in this embodiment of the application can provide an IP-based communication capability, so that better compatibility can be provided for the upper-layer applications, and the upper-layer applications use an L2-layer-based ACP without perceiving a forwarding manner as much as possible.

It should be understood that, in this embodiment of the application, a packet format of the L2 ACP packet is publicly known to a receive/transmit end device at the data link layer, that is, all devices at the data link layer can identify the L2 ACP packet.

In this embodiment of the application, signaling is transmitted in an ACP by using a UDI and a neighbor list of a device without depending on a loopback address, so that each device does not need to maintain a routing table. Each device has a UDI and a neighbor list of the device, and transmits signaling by directly using a ready-made resource, so that maintenance costs can be reduced.

In addition, the ACP in this embodiment of the application may be imperceptive of the IP protocol, so that it is not required that all network devices support IPv6 or IPv4, to establish a unified ACP. This has better network compatibility in comparison with the prior art, and also reduces difficulties in autonomic network deployment.

Therefore, in this embodiment of the application, signaling is transmitted in the ACP based on a UDI of a device, so that a problem in the prior art that the device needs to additionally maintain a routing table is avoided, and deployment costs can be reduced. In addition, in this embodiment of the application, signaling transmission in the ACP may be imperceptive of the IP protocol. For example, even though an entire network does not support IPv6, signaling may also be transmitted in the ACP. This has better network compatibility in comparison with the prior art, and can also reduce difficulties in network deployment. In addition, the solution provided in this embodiment of the application may be applied to a network in which some devices are configured as IPv6 and some devices are configured as IPv4.

Optionally, in the embodiments of the application, the AD message (denoted as a packet 1) involved in the method 100 and the method 200 and the L2 ACP packet (denoted as a packet 2) involved in the method 300 and the method 400 may be encapsulated based on a same frame format at a data link layer. For example, a value of a type field of a frame that is at the data link layer and is used for encapsulating the packet 1 and a value of a type field of a frame that is at the data link layer and is used for encapsulating the packet 2 may be the same. It should be understood that, the value of the type field of the frame that is at the data link layer and is used for encapsulating the packet 1 and the value of the type field of the frame that is at the data link layer and is used for encapsulating the packet 2 may be different.

For example, when the type of the frame used for encapsulating the packet 1 and the type of the frame used for encapsulating the packet 2 are assigned with a same value, the packet 1 and the packet 2 are distinguished by using different values assigned to flag bits in packet headers. For example, both the type of the frame for the packet 1 and the type of the frame for the packet 2 are 88e7. However, a flag bit in a packet header of the packet 1 is 0000 and is used to indicate that the frame at the data link layer carries an adjacency discovery AD message. A flag bit in a packet header of the packet 2 is 0001 and is used to indicate that the frame at the data link layer carries an ACP packet (that is, a packet used for transmitting signaling in an ACP). More specifically, for example, the packet 2 is classified into a neighbor unicast packet, a non-neighbor unicast packet, and a broadcast packet. Different values may be assigned to flag bits of the three different transmission types of packets 2 to distinguish the different transmission types of packets 2. For example, when the flag bit in the packet header of the packet 2 is 0001, it indicates that the frame at the data link layer carries the neighbor unicast packet. When the flag bit in the packet header of the packet 2 is 0002, it indicates that the frame at the data link layer carries the non-neighbor unicast packet. When the flag bit in the packet header of the packet 2 is 0003, it indicates that the frame at the data link layer carries the broadcast packet.

For example, when the type of the frame for the packet 1 and the type of the frame for the packet 2 are assigned with different values. The types of the frames may be used to distinguish the packet 1 and the packet 2. For example, the type of the frame that is at the data link layer and is used for encapsulating the packet 1 is assigned with 88e7, and the type that is at the data link layer and is used for encapsulating the packet 2 is assigned with 88e8. More specifically, for example, the packet 2 is classified into a neighbor unicast packet, a non-neighbor unicast packet, and a broadcast packet. Types of frames for the three transmission types of packets 2 may be assigned with different values, so as to distinguish different transmission types of packets 2. For example, a type of a frame that is at the data link layer and is used for encapsulating the neighbor unicast packet is assigned with 88e8, a type of a frame that is at the data link layer and is used for encapsulating the non-neighbor unicast packet is assigned with 88e9, and a type of a frame that is at the data link layer and is used for encapsulating the broadcast packet is assigned with 88e6. It should be understood that, the types of the frames for the three transmission types of packets 2 may be assigned with a same value, and the flag bit is used to distinguish the three transmission types of packets 2. This is not limited in the embodiments of the application.

Figure 6:
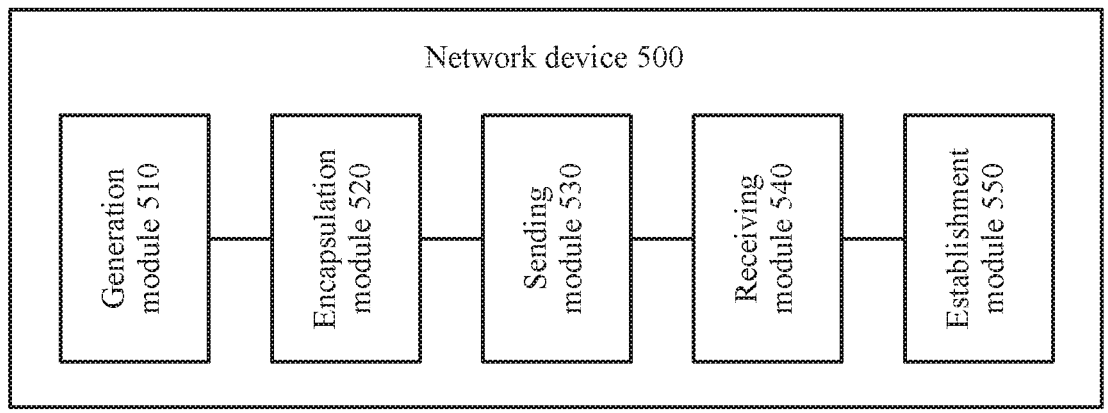
FIG. 6 shows a schematic block diagram of a network device according to an embodiment of the application.

FIG. 6 shows a network device 500 according to an embodiment of the application. The network device is applied to an autonomic network, and the network device 500 includes: a generation module 510, an encapsulation module 520, a sending module 530, a receiving module 540, and an establishment module 550.

The generation module 510 is configured to generate, by the network device, an adjacency discovery AD message. The AD message includes a device identifier of the network device.

The encapsulation module 520 is configured to encapsulate, based on a frame at a data link layer, the AD message generated by the generation module. The frame at the data link layer includes a source data link layer address and a destination data link layer address, and the source data link layer address is a data link layer address of the network device.

It should be understood that, the destination data link layer address of the frame at the data link layer may be a broadcast data link layer address or a data link layer address of a neighboring device of the network device.

The sending module 530 is configured to send, to a registrar Registrar device based on the destination data link layer address, the AD message that is encapsulated by the encapsulation module based on the frame at the data link layer. The registrar device is a device that is in the autonomic network and that supports allocation of a domain certificate.

The receiving module 540 is configured to receive a domain certificate sent by the registrar device. The domain certificate is allocated by the registrar device to the network device according to the device identifier of the network device in the AD message.

The establishment module 550 is configured to establish an autonomic control plane ACP with the registrar device according to the domain certificate received by the receiving module.

In this embodiment of the application, an AD message is encapsulated based on a frame at a data link layer, the AD message encapsulated based on the frame at the data link layer is sent to a registrar device based on a destination data link layer address of the frame at the data link layer, a domain certificate sent by the registrar device is received, and an autonomic control plane ACP is established with the registrar device according to the domain certificate. Therefore, in this embodiment of the application, establishment of an ACP may not depend on the IP protocol, that is, communication based on an autonomic network may be imperceptive of the IP protocol. This has better network compatibility in comparison with the prior art, and can effectively reduce obstacles to autonomic network deployment.

Optionally, in this embodiment of the application, the frame at the data link layer is a frame that conforms to a definition in the Ethernet protocol, and a type value of a type field of the frame at the data link layer indicates that a data load field of the frame at the data link layer carries a data link layer-based autonomic control plane L2 ACP packet.

Optionally, in this embodiment of the application, a packet header of the L2 ACP packet includes a flag bit field, and a value of the flag bit field indicates that the L2 ACP packet is the AD message.

Optionally, in this embodiment of the application, the packet header of the L2 ACP packet further includes a version field, a protocol field, and a data packet length field.

Optionally, in this embodiment of the application, the data link layer address is a Media Access Control MAC address.

Optionally, in this embodiment of the application, the device identifier is a unique device identifier UDI or a secure unique device identification SUDI.

It should be understood that, the network device 500 according to this embodiment of the application may be corresponding to a network device in a data link layer-based communication method in an embodiment of the application, and the foregoing and other operations and/or functions of the modules of the network device 500 are separately used to implement corresponding procedures of methods in FIG. 1 to FIG. 5. For brevity, details are not described herein.

In this embodiment of the application, an AD message is encapsulated based on a frame at a data link layer, the AD message encapsulated based on the frame at the data link layer is sent to a registrar device based on a destination data link layer address of the frame at the data link layer, a domain certificate sent by the registrar device is received, and an autonomic control plane ACP is established with the registrar device according to the domain certificate. Therefore, in this embodiment of the application, establishment of an ACP may not depend on the IP protocol, that is, communication based on an autonomic network may be imperceptive of the IP protocol. This has better network compatibility in comparison with the prior art, and can effectively reduce obstacles to autonomic network deployment.

Figure 7:
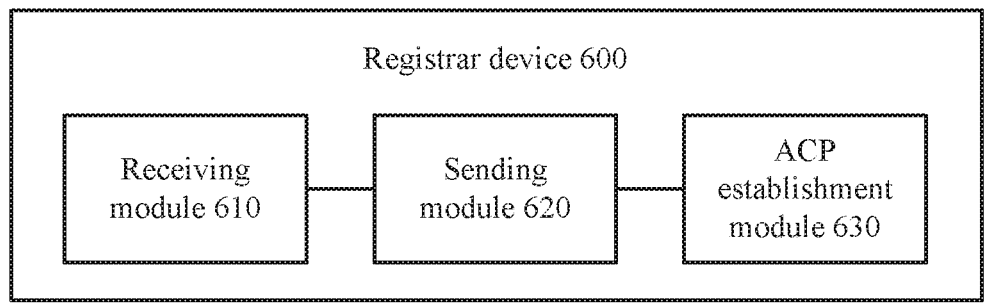
FIG. 7 shows a schematic block diagram of a registrar device according to an embodiment of the application.

FIG. 7 shows a registrar device 600 according to an embodiment of the application. The registrar device 600 is applied to an autonomic network, the registrar device 600 is a device that is in the autonomic network and that supports allocation of a domain certificate, and the registrar device 600 includes: a receiving module 610, a sending module 620, and an ACP establishment module 630.

The receiving module 610 is configured to receive, from a network device, an adjacency discovery AD message encapsulated based on a frame at a data link layer. The AD message includes a device identifier of the network device, the frame at the data link layer includes a source data link layer address and a destination data link layer address, the source data link layer address is a data link layer address of the network device, and the destination data link layer address matches a data link layer address of the registrar device.

It should be understood that, that the destination data link layer address matches a data link layer address of the registrar device means that the destination data link layer address is the data link layer address of the registrar device, or that the destination data link layer address is a broadcast data link layer address. It should be understood that, it may be considered that the broadcast data link layer address matches any fixed data link layer address.

The sending module 620 is configured to: when determining that the network device is allowed to join the autonomic network, allocate a domain certificate to the network device according to the device identifier included in the AD message received by the receiving module, and send the domain certificate to the network device.

The ACP establishment module 630 is configured to establish an autonomic control plane ACP with the network device according to the domain certificate sent by the sending module.

In this embodiment of the application, an adjacency discovery AD message of a device is encapsulated based on a frame at a data link layer. The AD message is sent, based on a data link layer address, to a registrar device that is in an autonomic network and that allocates a domain certificate. The registrar device allocates a domain certificate to the device according to the AD message. The device establishes an autonomic control plane ACP with the registrar device based on the domain certificate. Therefore, in this embodiment of the application, establishment of an ACP may not depend on the IP protocol, that is, communication based on an autonomic network may be imperceptive of the IP protocol. This has better network compatibility in comparison with the prior art, and can effectively reduce obstacles to autonomic network deployment.

Optionally, in this embodiment of the application, the frame at the data link layer is a frame that conforms to a definition in the Ethernet protocol, and a type value of a type field of the frame at the data link layer indicates that a data load field of the frame at the data link layer carries a data link layer-based autonomic control plane L2 ACP packet.

Optionally, in this embodiment of the application, a packet header of the L2 ACP packet includes a flag bit field, and a value of the flag bit field indicates that the L2 ACP packet is the AD message.

Optionally, in this embodiment of the application, the network device is a neighboring device of the registrar device, and the registrar device further includes:

a neighbor list establishment module 640, configured to establish a neighbor list of the registrar device according to the AD message, where the neighbor list includes the device identifier of the network device and the data link layer address of the network device.

Optionally, in this embodiment of the application, the device identifier of the network device is a unique device identifier UDI of the network device.

The sending module 620 is specifically configured to: when determining that a whitelist has a match item for the UDI of the network device, determine that the network device is allowed to join the autonomic network, and send, to the network device, the domain certificate allocated according to the UDI. The whitelist includes a UDI of a device that is allowed to join the autonomic network.

Optionally, in this embodiment of the application, the device identifier of the network device is a secure unique device identification S-UDI of the network device.

The sending module 620 is specifically configured to: when determining, by using a verification server, that a digital device certificate corresponding to the S-UDI is valid, determine that the network device is allowed to join the autonomic network, and send, to the network device, the domain certificate allocated according to the digital device certificate.

Optionally, in this embodiment of the application, the packet header of the L2 ACP packet further includes a version field, a protocol field, and a data packet length field.

Optionally, in this embodiment of the application, the data link layer address is a Media Access Control MAC address.

It should be understood that, the registrar device 600 according to this embodiment of the application may be corresponding to a registrar device in a data link layer-based communication method in an embodiment of the application, and the foregoing and other operations and/or functions of the modules of the registrar device 600 are separately used to implement corresponding procedures of methods in FIG. 1 to FIG. 5. For brevity, details are not described herein.

In this embodiment of the application, an adjacency discovery AD message of a device is encapsulated based on a frame at a data link layer. The AD message is sent, based on a data link layer address, to a registrar device that is in an autonomic network and that allocates a domain certificate. The registrar device allocates a domain certificate to the device according to the AD message. The device establishes an autonomic control plane ACP with the registrar device based on the domain certificate. Therefore, in this embodiment of the application, establishment of an ACP may not depend on the IP protocol, that is, communication based on an autonomic network may be imperceptive of the IP protocol. This has better network compatibility in comparison with the prior art, and can effectively reduce obstacles to autonomic network deployment.

Figure 8:
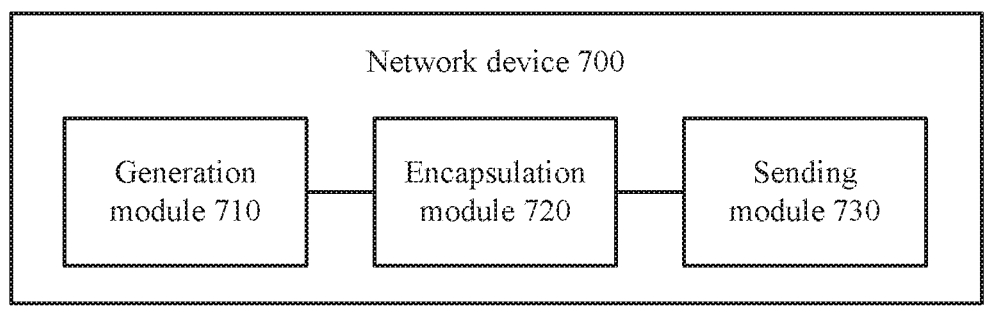
FIG. 8 shows a schematic block diagram of another network device according to an embodiment of the application.

FIG. 8 shows a network device 700 according to an embodiment of the application. The network device serves as a first network device, and the first network device is applied to an autonomic network. The network device 700 includes: a generation module 710, an encapsulation module 720, and a sending module 730.

The generation module 710 is configured to generate a data link layer-based autonomic control plane L2 ACP packet. The first network device is an autonomic device in the autonomic network.

The encapsulation module 720 is configured to encapsulate, based on a frame at a data link layer, the L2 ACP packet generated by the generation module. The frame at the data link layer includes a source data link layer address and a destination data link layer address, and the source data link layer address is a data link layer address of the first network device.

It should be understood that, the destination data link layer address of the frame at the data link layer is a data link layer address of a neighboring device of the first network device or a broadcast data link layer address.

The sending module 730 is configured to send, to a second network device according to the destination data link layer address, the L2 ACP packet that is encapsulated by the encapsulation module based on the frame at the data link layer. The second network device is also an autonomic device in the autonomic network, and the second network device is a neighboring device of the first network device.

In this embodiment of the application, the L2 ACP packet is encapsulated based on a frame at a data link layer, and the L2 ACP packet encapsulated based on the frame at the data link layer is sent to a second network device according to the destination data link layer address. In this embodiment of the application, a packet may be transmitted in an ACP without depending on the IP protocol. This has better network compatibility in comparison with the prior art.

In addition, unlike the prior art, in this embodiment of the application, a network device may not need to maintain a routing table.

Optionally, in this embodiment of the application, the frame at the data link layer is a frame that conforms to a definition in the Ethernet protocol, and a type value of a type field of the frame at the data link layer indicates that a data load field of the frame at the data link layer carries the L2 ACP packet.

Optionally, in this embodiment of the application, the generation module 710 is specifically configured to generate the L2 ACP packet when the first network device needs to communicate with a target device in the autonomic network and the generation module 710 determines that a neighbor list of the first network device includes a match item for a device identifier of the target device. A packet header of the L2 ACP packet includes a flag bit field, a value of the flag bit field is used to indicate that the L2 ACP packet is a neighbor unicast packet, and the neighbor list of the first network device includes a device identifier and a data link layer address of a neighboring device of the first network device.

It should be understood that, that the neighbor list of the first network device includes a match item for a device identifier of the target device means that the neighbor list of the first network device includes a device identifier the same as the device identifier of the target device. It should be further understood that, when the device identifier of the target device is a broadcast device identifier, it may also be considered that the neighbor list of the first network device includes the match item for the device identifier of the target device. If the neighbor list of the first network device does not include a device identifier the same as the device identifier of the target device, and the device identifier of the target device is not a broadcast device identifier either, it is considered that the neighbor list of the first network device does not include the match item for the device identifier of the target device.

The encapsulation module 720 is specifically configured to encapsulate, based on the frame at the data link layer, the L2 ACP packet. The destination data link layer address of the frame at the data link layer is a data link layer address of the target device.

The sending module 730 is specifically configured to send, according to the data link layer address of the target device, the L2 ACP packet encapsulated based on the frame at the data link layer to the target device.

Optionally, in this embodiment of the application, the generation module 710 is specifically configured to generate the L2 ACP packet when the first network device needs to communicate with a target device in the autonomic network and the generation module 710 determines that the neighbor list does not include a match item for a device identifier of the target device. A packet header of the L2 ACP packet includes a flag bit field, and a value of the flag bit field is used to indicate that the L2 ACP packet is a non-neighbor unicast packet.

The encapsulation module 720 is specifically configured to encapsulate, based on the frame at the data link layer, the L2 ACP packet. The destination data link layer address of the frame at the data link layer is a broadcast data link layer address.

The sending module 730 is specifically configured to send, according to the broadcast data link layer address, the L2 ACP packet encapsulated based on the frame at the data link layer to the second network device.

Optionally, in this embodiment of the application, the generation module 710 is specifically configured to generate the L2 ACP packet when the first network device needs to broadcast a control message in the ACP. A packet header of the L2 ACP packet includes a flag bit field, and a value of the flag bit field is used to indicate that the L2 ACP packet is a broadcast packet.

Specifically, the control message may be control signaling that implements a control function and/or a management function.

The encapsulation module 720 is specifically configured to encapsulate, based on the frame at the data link layer, the L2 ACP packet. The destination data link layer address of the frame at the data link layer is a broadcast data link layer address.

The sending module 730 is specifically configured to send, according to the broadcast data link layer address, the L2 ACP packet encapsulated based on the frame at the data link layer to the second network device.

Optionally, in this embodiment of the application, the packet header of the L2 ACP packet further includes a packet ID used to uniquely indicate the L2 ACP packet.

Optionally, in this embodiment of the application, the packet header of the L2 ACP packet further includes timing information. The timing information is used to instruct a receiving device of the L2 ACP packet to clear the L2 ACP packet when a time for buffering the L2 ACP packet exceeds preset duration.

Optionally, in this embodiment of the application, the packet header of the L2 ACP packet further includes a version field, a protocol field, and a data packet length field.

Optionally, in this embodiment of the application, the data link layer address is a Media Access Control MAC address.

Optionally, in this embodiment of the application, the device identifier is a unique device identifier UDI or a secure unique device identification SUDI.

Optionally, in this embodiment of the application, each autonomic device in the autonomic network has an IP address, and each autonomic device has a mapping relationship between a device identifier of each autonomic device and the IP address of each autonomic device.

The generation module 710 is specifically configured to generate the L2 ACP packet when the first network device needs to communicate with a target device in the ACP by using an IP session. The L2 ACP packet further includes a destination IP address, and the destination IP address is an IP address of the target device.

It should be understood that, the network device 700 according to this embodiment of the application may be corresponding to a first network device in a data link layer-based communication method in an embodiment of the application, and the foregoing and other operations and/or functions of the modules of the network device 700 are separately used to implement corresponding procedures of methods in FIG. 1 to FIG. 5. For brevity, details are not described herein.

An L2 ACP packet sent in this embodiment of the application is encapsulated based on a frame at a data link layer. The L2 ACP packet may be transmitted in an ACP based on a destination data link layer address of the L2 ACP packet. That is, in this embodiment of the application, communication based on the ACP may not depend on the IP protocol. This has better network compatibility in comparison with the prior art.

In addition, unlike the prior art, in this embodiment of the application, a device can implement communication based on the ACP without maintaining a routing table.

Figure 9:
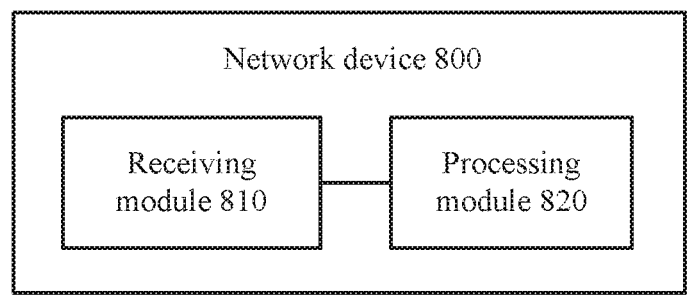
FIG. 9 shows a schematic block diagram of still another network device according to an embodiment of the application.

FIG. 9 shows a network device 800 according to an embodiment of the application. The network device 800 serves as a second network device, and the second network device is applied to an autonomic network. The network device 800 includes: a receiving module 810 and a processing module 820.

The receiving module 810 is configured to receive an L2 ACP packet that is encapsulated based on a frame at a data link layer and that is sent by a first network device. The L2 ACP packet includes a destination device identifier, the frame at the data link layer includes a source data link layer address and a destination data link layer address, the source data link layer address is a data link layer address of the first network device, the destination data link layer address matches a data link layer address of the second network device, and both the second network device and the first network device are autonomic devices in the autonomic network.

It should be understood that, that the destination data link layer address matches a data link layer address of the second network device means that the destination data link layer address is the data link layer address of the second network device, or that the destination data link layer address is a broadcast data link layer address. It should be understood that, it may be considered that the broadcast data link layer address matches any fixed data link layer address.

The processing module 820 is configured to process, by determining whether a device identifier of the second network device matches the destination device identifier in the L2 ACP packet, the L2 ACP packet received by the receiving module.

It should be understood that, when the destination device identifier is the device identifier of the second network device, or the destination device identifier is a broadcast device identifier, it may be considered that the destination device identifier matches the device identifier of the second network device. When the destination device identifier is not the device identifier of the second network device, and the destination device identifier is not a broadcast device identifier, the destination device identifier does not match the device identifier of the second network device.

It should be understood that, in this embodiment of the application, the autonomic control plane ACP of the autonomic network is established based on the data link layer. For a specific method, refer to the method 100 and the method 200. Details are not described herein again.

An L2 ACP packet in this embodiment of the application is encapsulated based on a frame at a data link layer. The L2 ACP packet may be transmitted in an ACP based on a destination data link layer address of the L2 ACP packet. That is, in this embodiment of the application, communication based on the ACP may not depend on the IP protocol. This has better network compatibility in comparison with the prior art.

In addition, unlike the prior art, in this embodiment of the application, a device can implement communication based on the ACP without maintaining a routing table.

Optionally, in this embodiment of the application, the frame at the data link layer is a frame that conforms to a definition in the Ethernet protocol, and a type value of a type field of the frame at the data link layer indicates that a data load field of the frame at the data link layer carries the L2 ACP packet.

Optionally, in this embodiment of the application, the packet header of the L2 ACP packet includes a flag bit field, and a value of the flag bit field is used to indicate that the L2 ACP packet is a neighbor unicast packet. The destination data link layer address of the frame at the data link layer is a data link layer address of the target device.

The processing module 820 is specifically configured to: determine that the destination device identifier is the device identifier of the second network device, and parse the L2 ACP packet.

Specifically, the processing module 820 is specifically configured to parse the L2 ACP packet to obtain packet content such as a control message in the L2 ACP packet. Specifically, the control message may be control signaling that implements a control function and/or a management function.

Optionally, in this embodiment of the application, the packet header of the L2 ACP packet includes a flag bit field, and a value of the flag bit field is used to indicate that the L2 ACP packet is a non-neighbor unicast packet. The destination data link layer address of the frame at the data link layer is a broadcast data link layer address.

The processing module 820 is specifically configured to: when determining that the device identifier of the second network device matches the destination device identifier, parse the L2 ACP packet, and buffer the L2 ACP packet.

Specifically, the L2 ACP packet is parsed to obtain packet content such as a control message in the L2 ACP packet.

The processing module 820 is specifically configured to: when determining that the device identifier of the second network device does not match the destination device identifier, buffer the L2 ACP packet, and forward, according to the destination data link layer address of the frame at the data link layer, the L2 ACP packet encapsulated based on the frame at the data link layer to a neighboring device of the second network device.

Optionally, in this embodiment of the application, the packet header of the L2 ACP packet further includes a flag bit field, and a value of the flag bit field is used to indicate that the L2 ACP packet is a broadcast packet. The destination data link layer address of the frame at the data link layer is a broadcast data link layer address.

The processing module 820 is specifically configured to: determine that the device identifier of the second network device matches the destination device identifier, parse the L2 ACP packet, buffer the L2 ACP packet, and forward, according to the destination data link layer address of the frame at the data link layer, the L2 ACP packet encapsulated based on the frame at the data link layer to a neighboring device of the second network device.

It should be understood that, in this embodiment of the application, the L2 ACP packet is a broadcast packet, and the destination device identifier in the L2 ACP packet may be a broadcast device identifier. In this case, after receiving the L2 ACP packet, any network device in the autonomic network determines that a device identifier of the network device matches the destination device identifier.

It should be further understood that, when the L2 ACP packet is a broadcast packet, the L2 ACP packet may not include the destination device identifier. If determining, according to a flag bit of the L2 ACP packet, that the L2 ACP packet is a broadcast packet, the network device parses and forwards the L2 ACP packet without determining whether device identifiers are matched.

Optionally, in this embodiment of the application, the packet header of the L2 ACP packet further includes a packet ID used to uniquely identify the L2 ACP packet.

The processing module 820 is specifically configured to: when determining that the processing module 820 does not buffer the packet ID, process the L2 ACP packet by determining whether the device identifier of the second network device matches the destination device identifier.

Optionally, in this embodiment of the application, the packet header of the L2 ACP packet further includes timing information. The timing information is used to instruct a receiving device of the L2 ACP packet to clear the L2 ACP packet when a time for buffering the L2 ACP packet exceeds preset duration.

The network device 800 further includes:
a buffer clearing module 830, configured to clear the L2 ACP packet when determining that the time for buffering the L2 ACP packet exceeds the preset duration indicated by the timing information.

Optionally, in this embodiment of the application, the packet header of the L2 ACP packet further includes a version field, a protocol field, and a data packet length field.

Optionally, in this embodiment of the application, the data link layer address is a Media Access Control MAC address.

Optionally, in this embodiment of the application, the device identifier is a unique device identifier UDI or a secure unique device identification SUDI.

Optionally, in this embodiment of the application, each autonomic device in the autonomic network has an IP address, and each autonomic device has a mapping relationship between a device identifier of each autonomic device and the IP address of each autonomic device. The L2 ACP packet further includes a destination IP address.

The processing module 820 is specifically configured to: when the second network device determines that the device identifier of the second network device does not match the destination device identifier in the L2 ACP packet, forward the L2 ACP packet to a neighboring device of the second network device according to the destination data link layer address of the L2 ACP packet.

The processing module 820 is specifically configured to parse the L2 ACP packet when the second network device determines that the device identifier of the second network device matches the destination device identifier in the L2 ACP packet and that an IP address of the second network device matches the destination IP address of the L2 ACP packet.

It should be understood that, the network device 800 according to this embodiment of the application may be corresponding to a second network device in a data link layer-based communication method in an embodiment of the application, and the foregoing and other operations and/or functions of the modules of the network device 800 are separately used to implement corresponding procedures of methods in FIG. 1 to FIG. 5. For brevity, details are not described herein.

An L2 ACP packet sent in this embodiment of the application is encapsulated based on a frame at a data link layer. The L2 ACP packet may be transmitted in an ACP based on a destination data link layer address of the L2 ACP packet. That is, in this embodiment of the application, communication based on the ACP may not depend on the IP protocol. This has better network compatibility in comparison with the prior art.

In addition, unlike the prior art, in this embodiment of the application, a device can implement communication based on the ACP without maintaining a routing table.

Figure 10:
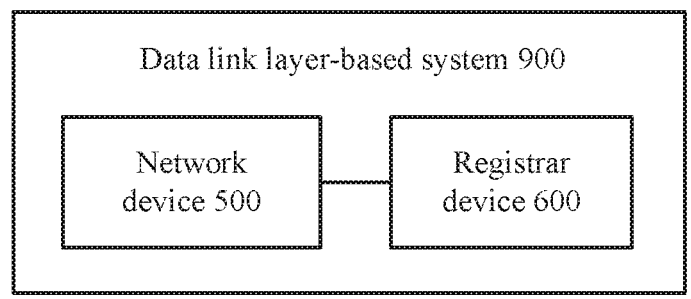
FIG. 10 shows a schematic block diagram of a data link layer-based system according to an embodiment of the application.

FIG. 10 shows a schematic block diagram of an autonomic network based system 900 according to an embodiment of the application. The system 900 includes the network device 500 and the registrar device 600 provided in the embodiments of the application.

In this embodiment of the application, an AD message is encapsulated based on a frame at a data link layer, the AD message encapsulated based on the frame at the data link layer is sent to a registrar device based on a destination data link layer address of the frame at the data link layer, a domain certificate sent by the registrar device is received, and an autonomic control plane ACP is established with the registrar device according to the domain certificate. Therefore, in this embodiment of the application, establishment of an ACP may not depend on the IP protocol, that is, communication based on an autonomic network may be imperceptive of the IP protocol. This has better network compatibility in comparison with the prior art, and can effectively reduce obstacles to autonomic network deployment.

Figure 11:
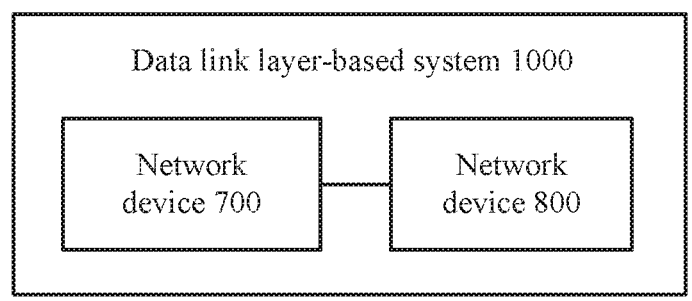
FIG. 11 shows a schematic block diagram of a data link layer-based system according to another embodiment of the application.

FIG. 11 shows a schematic block diagram of an autonomic network based system 1000 according to an embodiment of the application. The system 1000 includes the network device 700 and the network device 800 provided in the embodiments of the application.

An L2 ACP packet sent in this embodiment of the application is encapsulated based on a frame at a data link layer. The L2 ACP packet may be transmitted in an ACP based on a destination data link layer address of the L2 ACP packet. That is, in this embodiment of the application, communication based on the ACP may not depend on the IP protocol. This has better network compatibility in comparison with the prior art.

In addition, unlike the prior art, in this embodiment of the application, a device can implement communication based on the ACP without maintaining a routing table.

Figure 12:
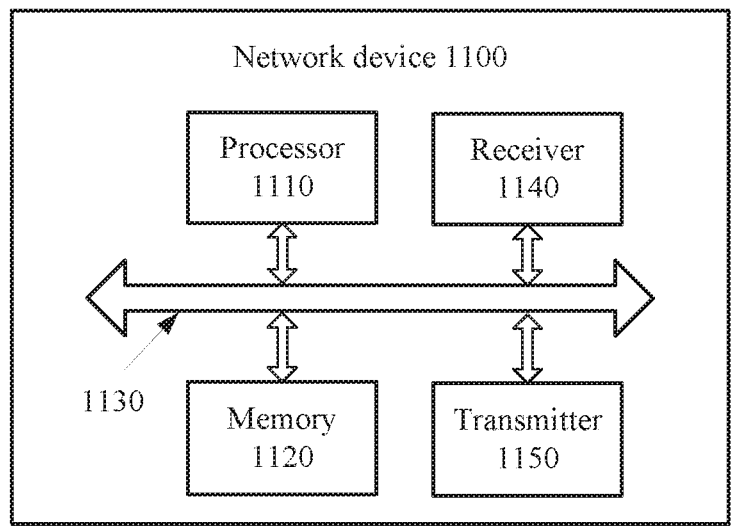
FIG. 12 shows a schematic block diagram of a network device according to another embodiment of the application.

FIG. 12 shows a schematic block diagram of a network device 1100 according to an embodiment of the application. The network device 1100 includes a processor 1110, a memory 1120, a bus system 1130, a receiver 1140, and a transmitter 1150. The processor 1110, the memory 1120, the receiver 1140, and the transmitter 1150 are connected by using the bus system 1130. The memory 1120 is configured to store an instruction. The processor 1110 is configured to: generate an adjacency discovery AD message, where the AD message includes a device identifier of the network device; and encapsulate, based on a frame at a data link layer, the AD message, where the frame at the data link layer includes a source data link layer address and a destination data link layer address, and the source data link layer address is a data link layer address of the network device. The transmitter 1150 is configured to send, based on the destination data link layer address, the AD message encapsulated based on the frame at the data link layer to a registrar device, where the registrar device is a device that is in an autonomic network and that supports allocation of a domain certificate. The receiver 1140 is configured to receive a domain certificate by the registrar device, where the domain certificate is allocated by the registrar device to the network device according to the device identifier of the network device in the AD message. The processor 1110 is further configured to establish an autonomic control plane ACP with the registrar device according to the domain certificate.

In this embodiment of the application, an AD message is encapsulated based on a frame at a data link layer, the AD message encapsulated based on the frame at the data link layer is sent to a registrar device based on a destination data link layer address of the frame at the data link layer, a domain certificate sent by the registrar device is received, and an autonomic control plane ACP is established with the registrar device according to the domain certificate. Therefore, in this embodiment of the application, establishment of an ACP may not depend on the IP protocol, that is, communication based on an autonomic network may be imperceptive of the IP protocol. This has better network compatibility in comparison with the prior art, and can effectively reduce obstacles to autonomic network deployment.

Optionally, in this embodiment of the application, the frame at the data link layer is a frame that conforms to a definition in the Ethernet protocol, and a type value of a type field of the frame at the data link layer indicates that a data load field of the frame at the data link layer carries a data link layer-based autonomic control plane L2 ACP packet.

Optionally, in this embodiment of the application, a packet header of the L2 ACP packet includes a flag bit field, and a value of the flag bit field indicates that the L2 ACP packet is the AD message.

Optionally, in this embodiment of the application, the packet header of the L2 ACP packet further includes a version field, a protocol field, and a data packet length field.

Optionally, in this embodiment of the application, the data link layer address is a Media Access Control MAC address.

Optionally, in this embodiment of the application, the device identifier is a unique device identifier UDI or a secure unique device identification SUDI.

It should be understood that, the network device 1100 according to this embodiment of the application may be corresponding to a network device in a data link layer-based communication method in an embodiment of the application, and may be corresponding to the network device 500 in an embodiment of the application. The foregoing and other operations and/or functions of the modules of the network device 1100 are separately used to implement corresponding procedures of methods in FIG. 1 to FIG. 5. For brevity, details are not described herein.

In this embodiment of the application, an AD message is encapsulated based on a frame at a data link layer, the AD message encapsulated based on the frame at the data link layer is sent to a registrar device based on a destination data link layer address of the frame at the data link layer, a domain certificate sent by the registrar device is received, and an autonomic control plane ACP is established with the registrar device according to the domain certificate. Therefore, in this embodiment of the application, establishment of an ACP may not depend on the IP protocol, that is, communication based on an autonomic network may be imperceptive of the IP protocol. This has better network compatibility in comparison with the prior art, and can effectively reduce obstacles to autonomic network deployment.

Figure 13:
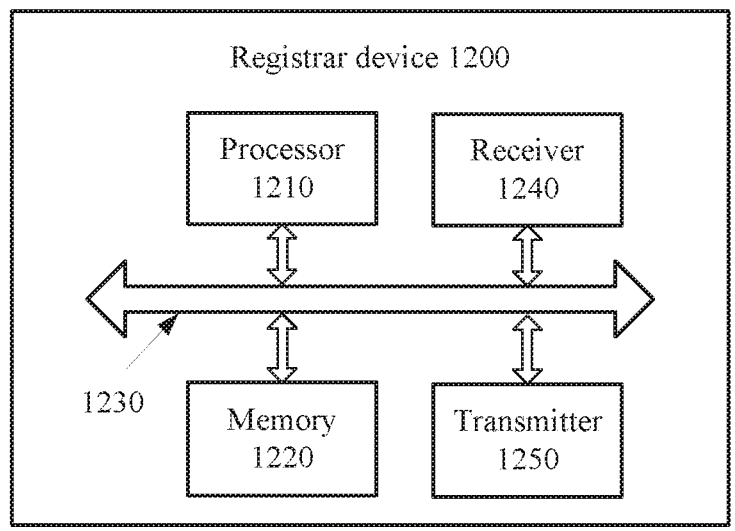
FIG. 13 shows a schematic block diagram of a registrar device according to another embodiment of the application.

FIG. 13 shows a schematic block diagram of a registrar device 1200 according to an embodiment of the application. The registrar device 1200 is applied to an autonomic network. The registrar device 1200 includes a processor 1210, a memory 1220, a bus system 1230, a receiver 1240, and a transmitter 1250. The processor 1210, the memory 1220, the receiver 1240, and the transmitter 1250 are connected by using the bus system 1230. The memory 1220 is configured to store an instruction.

The receiver 1240 is configured to receive, from a network device, an adjacency discovery AD message encapsulated based on a frame at a data link layer. The AD message includes a device identifier of the network device, the frame at the data link layer includes a source data link layer address and a destination data link layer address, the source data link layer address is a data link layer address of the network device, and the destination data link layer address matches a data link layer address of the registrar device. The processor 1210 is configured to: when determining that the network device is allowed to join the autonomic network, allocate a domain certificate to the network device according to the device identifier included in the AD message. The transmitter 1250 is configured to send the domain certificate to the network device. The processor 1210 is further configured to establish an autonomic control plane ACP with the network device according to the domain certificate.

In this embodiment of the application, an adjacency discovery AD message of a device is encapsulated based on a frame at a data link layer. The AD message is sent, based on a data link layer address, to a registrar device that is in an autonomic network and that allocates a domain certificate. The registrar device allocates a domain certificate to the device according to the AD message. The device establishes an autonomic control plane ACP with the registrar device based on the domain certificate. Therefore, in this embodiment of the application, establishment of an ACP may not depend on the IP protocol, that is, communication based on an autonomic network may be imperceptive of the IP protocol. This has better network compatibility in comparison with the prior art, and can effectively reduce obstacles to autonomic network deployment.

Optionally, in this embodiment of the application, the frame at the data link layer is a frame that conforms to a definition in the Ethernet protocol, and a type value of a type field of the frame at the data link layer indicates that a data load field of the frame at the data link layer carries a data link layer-based autonomic control plane L2 ACP packet.

Optionally, in this embodiment of the application, a packet header of the L2 ACP packet includes a flag bit field, and a value of the flag bit field indicates that the L2 ACP packet is the AD message.

Optionally, in this embodiment of the application, the network device is a neighboring device of the second network device. The processor 1210 is further configured to establish a neighbor list of the second network device according to the AD message. The neighbor list includes the device identifier of the network device and the data link layer address of the network device.

Optionally, in this embodiment of the application, the device identifier of the network device is a unique device identifier UDI of the network device.

The processor 1210 is further configured to: when determining that a whitelist has a match item for the UDI of the network device, determine that the network device is allowed to join the autonomic network, and allocate the domain certificate according to the UDI. The whitelist includes a UDI of a device that is allowed to join the autonomic network.

Optionally, in this embodiment of the application, the device identifier of the network device is a secure unique device identification S-UDI of the network device.

The processor 1210 is further configured to: when determining, by using a verification server, that a digital device certificate corresponding to the S-UDI is valid, determine that the network device is allowed to join the autonomic network, and allocate the domain certificate according to the digital device certificate.

Optionally, in this embodiment of the application, a packet header of the AD message further includes a version field, a protocol field, and a data packet length field.

Optionally, in this embodiment of the application, the data link layer address is a Media Access Control MAC address.

It should be understood that, the registrar device 1200 according to this embodiment of the application may be corresponding to a registrar device in a data link layer-based communication method in an embodiment of the application, and may be corresponding to the registrar device 600 in an embodiment of the application. The foregoing and other operations and/or functions of the modules of the registrar device 1200 are separately used to implement corresponding procedures of methods in FIG. 1 to FIG. 5. For brevity, details are not described herein.

In this embodiment of the application, an adjacency discovery AD message of a device is encapsulated based on a frame at a data link layer. The AD message is sent, based on a data link layer address, to a registrar device that is in an autonomic network and that allocates a domain certificate. The registrar device allocates a domain certificate to the device according to the AD message. The device establishes an autonomic control plane ACP with the registrar device based on the domain certificate. Therefore, in this embodiment of the application, establishment of an ACP may not depend on the IP protocol, that is, communication based on an autonomic network may be imperceptive of the IP protocol. This has better network compatibility in comparison with the prior art, and can effectively reduce obstacles to autonomic network deployment.

Figure 14:
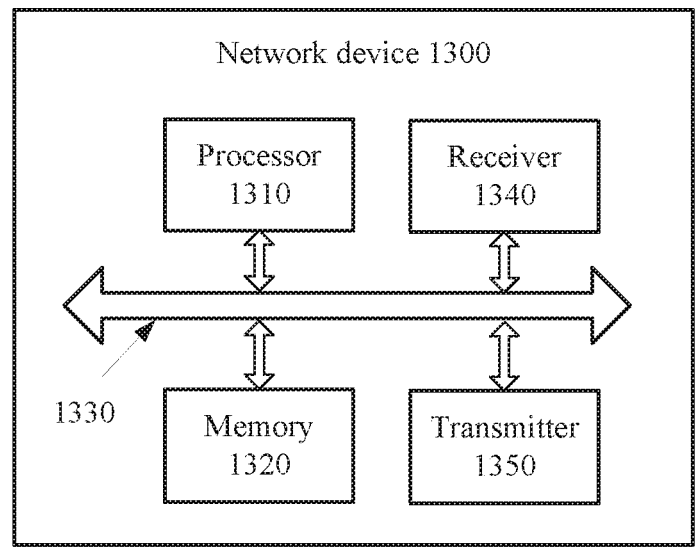
FIG. 14 shows a schematic block diagram of another network device according to another embodiment of the application.

FIG. 14 shows a schematic block diagram of a network device 1300 according to an embodiment of the application. The network device 1300 is applied to an autonomic network. The network device 1300 serves as a first network device. The network device 1300 includes a processor 1310, a memory 1330, a bus system 1330, a receiver 1340, and a transmitter 1350. The processor 1310, the memory 1330, the receiver 1340, and the transmitter 1350 are connected by using the bus system 1330. The memory 1330 is configured to store an instruction. The processor 1310 is configured to: generate a data link layer-based autonomic control plane L2 ACP packet, where the first network device is an autonomic device in the autonomic network; and encapsulate, based on a frame at a data link layer, the L2 ACP packet, where the frame at the data link layer includes a source data link layer address and a destination data link layer address, and the source data link layer address is a data link layer address of the first network device. The transmitter 1350 is configured to send, according to the destination data link layer address, the L2 ACP packet encapsulated based on the frame at the data link layer to a second network device. The second network device is also an autonomic device in the autonomic network, and the second network device is a neighboring device of the first network device.

In this embodiment of the application, the L2 ACP packet is encapsulated based on a frame at a data link layer, and the L2 ACP packet encapsulated based on the frame at the data link layer is sent to a second network device according to the destination data link layer address. In this embodiment of the application, a packet may be transmitted in an ACP without depending on the IP protocol. This has better network compatibility in comparison with the prior art.

In addition, unlike the prior art, in this embodiment of the application, a network device may not need to maintain a routing table.

Optionally, in this embodiment of the application, the frame at the data link layer is a frame that conforms to a definition in the Ethernet protocol, and a type value of a type field of the frame at the data link layer indicates that a data load field of the frame at the data link layer carries the data link layer-based autonomic control plane L2 ACP packet.

Optionally, in this embodiment of the application, the processor 1310 is specifically configured to: generate the L2 ACP packet when the first network device needs to communicate with a target device in the autonomic network and the processor 1310 determines that a neighbor list of the first network device includes a match item for a device identifier of the target device, where a packet header of the L2 ACP packet includes a flag bit field, a value of the flag bit field is used to indicate that the L2 ACP packet is a neighbor unicast packet, and the neighbor list of the first network device includes a device identifier and a data link layer address of a neighboring device of the first network device; and encapsulate, based on the frame at the data link layer, the L2 ACP packet, where the destination data link layer address of the frame at the data link layer is a data link layer address of the target device. The transmitter 1350 is specifically configured to send, according to the data link layer address of the target device, the L2 ACP packet encapsulated based on the frame at the data link layer to the target device.

Optionally, in this embodiment of the application, the processor 1310 is specifically configured to: generate the L2 ACP packet when the first network device needs to communicate with a target device in the autonomic network and the processor 1310 determines that the neighbor list does not include a match item for a device identifier of the target device, where a packet header of the L2 ACP packet includes a flag bit field, and a value of the flag bit field is used to indicate that the L2 ACP packet is a non-neighbor unicast packet; and encapsulate, based on the frame at the data link layer, the L2 ACP packet, where the destination data link layer address of the frame at the data link layer is a broadcast data link layer address. The transmitter 1350 is specifically configured to send, according to the broadcast data link layer address, the L2 ACP packet encapsulated based on the frame at the data link layer to the second network device.

Optionally, in this embodiment of the application, the processor 1310 is specifically configured to generate the L2 ACP packet when the first network device needs to broadcast a control message in the ACP, where a packet header of the L2 ACP packet includes a flag bit field, and a value of the flag bit field is used to indicate that the L2 ACP packet is a broadcast packet; and encapsulate, based on the frame at the data link layer, the L2 ACP packet, where the destination data link layer address of the frame at the data link layer is a broadcast data link layer address. The transmitter 1350 is specifically configured to send, according to the broadcast data link layer address, the L2 ACP packet encapsulated based on the frame at the data link layer to the second network device.

Specifically, the control message may be control signaling that implements a control function and/or a management function.

Optionally, in this embodiment of the application, the packet header of the L2 ACP packet further includes a packet ID used to uniquely indicate the L2 ACP packet.

Optionally, in this embodiment of the application, the packet header of the L2 ACP packet further includes timing information. The timing information is used to instruct a receiving device of the L2 ACP packet to clear the L2 ACP packet when a time for buffering the L2 ACP packet exceeds preset duration.

Optionally, in this embodiment of the application, each autonomic device in the autonomic network has an IP address, and each autonomic device has a mapping relationship between a device identifier of each autonomic device and the IP address of each autonomic device.

The processor 1310 is specifically configured to generate the L2 ACP packet when the first network device needs to communicate with a target device in the ACP by using an IP session. The L2 ACP packet further includes a destination IP address, and the destination IP address is an IP address of the target device.

Optionally, in this embodiment of the application, the packet header of the L2 ACP packet further includes a version field, a protocol field, and a data packet length field.

Optionally, in this embodiment of the application, the data link layer address is a Media Access Control MAC address.

Optionally, in this embodiment of the application, the device identifier is a unique device identifier UDI or a secure unique device identification SUDI.

It should be understood that, the network device 1300 according to this embodiment of the application may be corresponding to a first network device in a data link layer-based communication method in an embodiment of the application, and may be corresponding to the network device 700 in an embodiment of the application. The foregoing and other operations and/or functions of the modules of the network device 1300 are separately used to implement corresponding procedures of methods in FIG. 1 to FIG. 5. For brevity, details are not described herein.

An L2 ACP packet sent in this embodiment of the application is encapsulated based on a frame at a data link layer. The L2 ACP packet may be transmitted in an ACP based on a destination data link layer address of the L2 ACP packet. That is, in this embodiment of the application, communication based on the ACP may not depend on the IP protocol. This has better network compatibility in comparison with the prior art.

In addition, unlike the prior art, in this embodiment of the application, a device can implement communication based on the ACP without maintaining a routing table.

Figure 15:
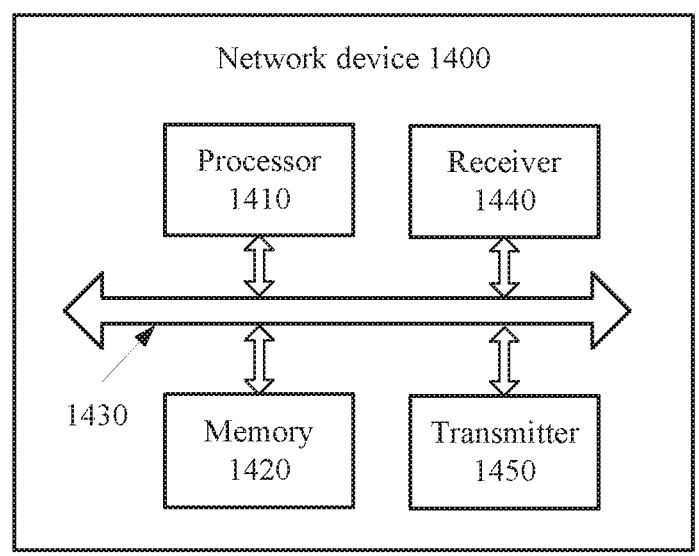
FIG. 15 shows a schematic block diagram of still another network device according to another embodiment of the application.

FIG. 15 shows a schematic block diagram of a network device 1400 according to an embodiment of the application. The network device 1400 is applied to an autonomic network. The network device 1400 serves as a second network device. The network device 1400 includes a processor 1410, a memory 1420, a bus system 1440, a receiver 1440, and a transmitter 1450. The processor 1410, the memory 1420, the receiver 1440, and the transmitter 1450 are connected by using the bus system 1440. The memory 1420 is configured to store an instruction. The receiver 1440 is configured to receive an L2 ACP packet that is encapsulated based on a frame at a data link layer and that is sent by a first network device. The L2 ACP packet includes a destination device identifier, the frame at the data link layer includes a source data link layer address and a destination data link layer address, the source data link layer address is a data link layer address of the first network device, the destination data link layer address matches a data link layer address of the second network device, and both the second network device and the first network device are autonomic devices in the autonomic network. The processor 1410 is configured to process the L2 ACP packet by determining whether a device identifier of the second network device matches the destination device identifier in the L2 ACP packet.

An L2 ACP packet sent in this embodiment of the application is encapsulated based on a frame at a data link layer. The L2 ACP packet may be transmitted in an ACP based on a destination data link layer address of the L2 ACP packet. That is, in this embodiment of the application, communication based on the ACP may not depend on the IP protocol. This has better network compatibility in comparison with the prior art.

In addition, unlike the prior art, in this embodiment of the application, a network device may not need to maintain a routing table.

Optionally, in this embodiment of the application, the frame at the data link layer is a frame that conforms to a definition in the Ethernet protocol, and a type value of a type field of the frame at the data link layer indicates that a data load field of the frame at the data link layer carries the data link layer-based autonomic control plane L2 ACP packet.

Optionally, in this embodiment of the application, a packet header of the L2 ACP packet includes a flag bit field, and a value of the flag bit field is used to indicate that the L2 ACP packet is a neighbor unicast packet. The destination data link layer address of the frame at the data link layer is a data link layer address of the target device.

The processor 1410 is specifically configured to: determine that the destination device identifier is the device identifier of the second network device, and parse the L2 ACP packet.

Optionally, in this embodiment of the application, a packet header of the L2 ACP packet includes a flag bit field, and a value of the flag bit field is used to indicate that the L2 ACP packet is a non-neighbor unicast packet. The destination data link layer address of the frame at the data link layer is a broadcast data link layer address.

The processor 1410 is specifically configured to: when determining that the device identifier of the second network device matches the destination device identifier, parse the L2 ACP packet, and buffer the L2 ACP packet; and when determining that the device identifier of the second network device does not match the destination device identifier, buffer the L2 ACP packet, and forward, according to the destination data link layer address of the frame at the data link layer, the L2 ACP packet encapsulated based on the frame at the data link layer to a neighboring device of the second network device.

Optionally, in this embodiment of the application, a packet header of the L2 ACP packet further includes a flag bit field, and a value of the flag bit field is used to indicate that the L2 ACP packet is a broadcast packet. The destination data link layer address of the frame at the data link layer is a broadcast data link layer address.

The processor 1410 is specifically configured to: determine that the device identifier of the second network device matches the destination device identifier, parse the L2 ACP packet, buffer the L2 ACP packet, and forward, according to the destination data link layer address of the frame at the data link layer, the L2 ACP packet encapsulated based on the frame at the data link layer to a neighboring device of the second network device.

Optionally, in this embodiment of the application, the packet header of the L2 ACP packet further includes a packet ID used to uniquely identify the L2 ACP packet.

The processor 1410 is specifically configured to: when determining that the processor 1410 does not buffer the packet ID, process the L2 ACP packet by determining whether the device identifier of the second network device matches the destination device identifier.

Optionally, in this embodiment of the application, the packet header of the L2 ACP packet further includes timing information. The timing information is used to instruct a receiving device of the L2 ACP packet to clear the L2 ACP packet when a time for buffering the L2 ACP packet exceeds preset duration.

The processor 1410 is further configured to clear the L2 ACP packet when determining that the time for buffering the L2 ACP packet exceeds the preset duration indicated by the timing information.

Optionally, in this embodiment of the application, each autonomic device in the autonomic network has an IP address, and each autonomic device has a mapping relationship between a device identifier of each autonomic device and the IP address of each autonomic device. The L2 ACP packet further includes a destination IP address.

The processor 1410 is specifically configured to: forward the L2 ACP packet to a neighboring device of the second network device according to the destination data link layer address of the L2 ACP packet when determining that the device identifier of the second network device does not match the destination device identifier in the L2 ACP packet; and parse the L2 ACP packet when determining that the device identifier of the second network device matches the destination data link layer of the L2 ACP packet and an IP address of the second network device matches the destination IP address of the L2 ACP packet.

Optionally, in this embodiment of the application, the packet header of the L2 ACP packet further includes a version field, a protocol field, and a data packet length field.

Optionally, in this embodiment of the application, the data link layer address is a Media Access Control MAC address.

Optionally, in this embodiment of the application, the device identifier is a unique device identifier UDI or a secure unique device identification SUDI.

It should be understood that, the network device 1400 according to this embodiment of the application may be corresponding to a second network device in a data link layer-based communication method in an embodiment of the application, and may be corresponding to the network device 800 in an embodiment of the application. The foregoing and other operations and/or functions of the modules of the network device 1400 are separately used to implement corresponding procedures of methods in FIG. 1 to FIG. 5. For brevity, details are not described herein.

An L2 ACP packet sent in this embodiment of the application is encapsulated based on a frame at a data link layer. The L2 ACP packet may be transmitted in an ACP based on a destination data link layer address of the L2 ACP packet. That is, in this embodiment of the application, communication based on the ACP may not depend on the IP protocol. This has better network compatibility in comparison with the prior art.

In addition, unlike the prior art, in this embodiment of the application, a device can implement communication based on the ACP without maintaining a routing table.

It should be further understood that the first, the second, the third, the fourth, the fifth, the sixth, the seventh, the eighth, and various numerical numbers involved in this specification are distinguished merely for ease of description, and are not intended to limit the scope of the embodiments of the application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the application. The execution sequences of the processes should be determined according to functions and internal logic of the processes, and should not be construed as any limitation on the implementation processes of the embodiments of the application.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the application.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the application, but are not intended to limit the protection scope of the application. Any variation or replacement readily figured out by a person skilled in the art within the technical scope disclosed in the application shall fall within the protection scope of the application. Therefore, the protection scope of the application shall be subject to the protection scope of the claims.

What is claimed is:

1. A data link layer-based communication method, wherein the communication method is applied to an autonomic network and comprises:
   receiving, by a registrar device from a network device, an adjacency discovery (AD) message encapsulated based on a frame at a data link layer, wherein the AD message comprises a device identifier of the network device, the frame at the data link layer comprises a source data link layer address and a destination data link layer address, the source data link layer address is a data link layer address of the network device, and the destination data link layer address matches a data link layer address of the registrar device;
   in response to determining that the network device is allowed to join the autonomic network, allocating, by the registrar device, a domain certificate to the network device according to the device identifier comprised in the AD message, and sending the domain certificate to the network device; and establishing, by the registrar device, an autonomic control plane (ACP) with the network device according to the domain certificate.

2. The method according to claim 1, wherein the frame at the data link layer is a frame that conforms to a definition in an Ethernet protocol, and a type value of a type field of the frame at the data link layer indicates that a data load field of the frame at the data link layer carries a data link layer-based autonomic control plane (L2 ACP) packet.

3. The method according to claim 2, wherein a packet header of the L2 ACP packet comprises a flag bit field, and a value of the flag bit field indicates that the L2 ACP packet is the AD message.

4. The method according to claim 1, wherein the network device is a neighboring device of the registrar device, and the method further includes:

establishing, by the registrar device, a neighbor list of the registrar device according to the AD message, where the neighbor list includes the device identifier of the network device and the data link layer address of the network device.

5. The method according to claim 1, wherein the device identifier of the network device is a unique device identifier (UDI) of the network device; and wherein in response to determining that the network device is allowed to join the autonomic network, allocating, by the registrar device, a domain certificate to the network device according to the device identifier included in the AD message, and sending the domain certificate to the network device includes:

in response to determining that a whitelist has a match item for the UDI of the network device, determining, by the registrar device, that the network device is allowed to join the autonomic network, and sending, to the network device, the domain certificate allocated according to the UDI, where the whitelist includes a UDI of a device that is allowed to join the autonomic network.

6. The method according to claim 1, wherein the device identifier of the network device is a secure unique device identification (S-UDI) of the network device; and wherein in response to determining that the network device is allowed to join the autonomic network, allocating, by the registrar device, a domain certificate to the network device according to the device identifier included in the AD message, and sending the domain certificate to the network device includes:

in response to determining, by using a verification server, that a digital device certificate corresponding to the S-UDI is valid, determining, by the registrar device, that the network device is allowed to join the autonomic network, and sending, to the network device, the domain certificate allocated according to the digital device certificate.

7. A network device, wherein the network device is applied to an autonomic network and comprises:

a non-transitory memory storage comprising instructions;

one or more hardware processors in communication with the non-transitory memory storage, wherein the one or more hardware processors execute the instructions to:

generate, by the network device, an adjacency discovery (AD) message, wherein the AD message comprises a device identifier of the network device; and encapsulate, based on a frame at a data link layer, the AD message, wherein the frame at the data link layer comprises a source data link layer address and a destination data link layer address, and the source data link layer address is a data link layer address of the network device;

a transmitter, configured to send, to a registrar device based on the destination data link layer address, the AD message that is encapsulated based on the frame at the data link layer, wherein the registrar device is a device that is in the autonomic network and that supports allocation of a domain certificate;

a receiver, configured to receive a domain certificate sent by the registrar device, wherein the domain certificate is allocated by the registrar device to the network device according to the device identifier of the network device in the AD message; and wherein the one or more hardware processors execute the instructions to establish an autonomic control plane (ACP) with the registrar device according to the domain certificate.

8. The network device according to claim 7, wherein the frame at the data link layer is a frame that conforms to a definition in an Ethernet protocol, and a type value of a type field of the frame at the data link layer indicates that a data load field of the frame at the data link layer carries a data link layer-based autonomic control plane (L2 ACP) packet.

9. The network device according to claim 8, wherein a packet header of the L2 ACP packet comprises a flag bit field, and a value of the flag bit field indicates that the L2 ACP packet is the AD message.

10. The network device according to claim 7, wherein the device identifier is a unique device identifier (UDI) or a secure unique device identification (SUDI).

11. A registrar device, wherein the registrar device is applied to an autonomic network, and the registrar device is a device that is in the autonomic network and that supports allocation of a domain certificate, and comprises:

a receiver, configured to receive, from a network device, an adjacency discovery (AD) message encapsulated based on a frame at a data link layer, wherein the AD message comprises a device identifier of the network device, the frame at the data link layer comprises a source data link layer address and a destination data link layer address, the source data link layer address is a data link layer address of the network device, and the destination data link layer address matches a data link layer address of the registrar device;

a non-transitory memory storage comprising instructions;

one or more hardware processors in communication with the non-transitory memory storage, wherein the one or more hardware processors execute the instructions to:

in response to determining that the network device is allowed to join the autonomic network, allocate a domain certificate to the network device according to the device identifier comprised in the AD message;

a transmitter, configured to send the domain certificate to the network device; and wherein the one or more hardware processors execute the instructions to:

establish an autonomic control plane (ACP) with the network device according to the domain certificate.

12. The registrar device according to claim 11, wherein the frame at the data link layer is a frame that conforms to a definition in an Ethernet protocol, and a type value of a type field of the frame at the data link layer indicates that a data load field of the frame at the data link layer carries a data link layer-based autonomic control plane (L2 ACP) packet.

13. The registrar device according to claim 12, wherein a packet header of the L2 ACP packet comprises a flag bit field, and a value of the flag bit field indicates that the L2 ACP packet is the AD message.

14. The registrar device according to claim 11, wherein the network device is a neighboring device of the registrar device, and the one or more hardware processors execute the instructions to:
 establish a neighbor list of the registrar device according to the AD message, where the neighbor list includes the device identifier of the network device and the data link layer address of the network device.

15. The registrar device according to claim 11,
wherein the device identifier of the network device is a unique device identifier (UDI) of the network device;
the one or more hardware processors execute the instructions to: in response to determining that a whitelist has a match item for the UDI of the network device, determine that the network device is allowed to join the autonomic network; and
the transmitter is configured to send, to the network device, the domain certificate allocated according to the UDI, where the whitelist includes a UDI of a device that is allowed to join the autonomic network.

16. The registrar device according to claim 11,
wherein the device identifier of the network device is a secure unique device identification (S-UDI) of the network device;
the one or more hardware processors execute the instructions to:
in response to determining, by using a verification server, that a digital device certificate corresponding to the S-UDI is valid, determine that the network device is allowed to join the autonomic network; and
the transmitter is configured to send, to the network device, the domain certificate allocated according to the digital device certificate.

* * * * *